US012760863B2

(12) United States Patent
Van Bommel et al.

(10) Patent No.: US 12,760,863 B2
(45) Date of Patent: Oct. 13, 2026

(54) LASER-PHOSPHOR LIGHT SOURCE WITH IMPROVED LIFETIME

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/147,070

(22) PCT Filed: Jan. 8, 2024

(86) PCT No.: PCT/EP2024/050293
§ 371 (c)(1),
(2) Date: Jul. 10, 2025

(87) PCT Pub. No.: WO2024/149706
PCT Pub. Date: Jul. 18, 2024

(65) Prior Publication Data

US 2026/0227051 A1 Aug. 6, 2026

(30) Foreign Application Priority Data

Jan. 10, 2023 (EP) .................................... 23150835

(51) Int. Cl.
*F21V 9/14* (2006.01)
*F21V 3/04* (2018.01)
(Continued)

(52) U.S. Cl.
CPC ................ *F21V 9/14* (2013.01); *F21V 3/049* (2013.01); *F21V 9/30* (2018.02); *G02B 27/283* (2013.01)

(58) Field of Classification Search
CPC .... F21V 3/04–12; F21V 9/14; F21V 9/30–45; G02B 27/28–288
See application file for complete search history.

(56) References Cited

U.S. PATENT DOCUMENTS 12,625,421 B2 * 5/2026 Wakabayashi ....... G03B 21/206
2018/0017219 A1 1/2018 Hikmet

FOREIGN PATENT DOCUMENTS

EP 3290992 A1 3/2018
WO 2022143318 A1 7/2022

* cited by examiner

*Primary Examiner* — Jason M Han

(57) ABSTRACT

The invention provides a light generating system (1000) comprising a first light generating arrangement (110), a second light generating arrangement (120), a luminescent element (210), a diffuser element (410), a beam direction control system (500), and a control system (300), wherein: (A) the first light generating arrangement (110) is configured to generate a first beam (B1) of first device light (111), wherein the first light generating arrangement (110) comprises a first solid state laser light source (10); (B) the second light generating arrangement (120) is configured to generate a second beam (B2) of second device light (121), wherein the second light generating arrangement (120) comprises a second solid state laser light source (20); (C) the luminescent element (210) comprises a luminescent material (200), wherein the luminescent material (200) is able to convert the first 10 device light (111) and/or the second device light (121) received by the luminescent material (200) into luminescent material light (201); (D) the diffuser element (410) is configured to diffuse first device light (111) and/or the second device light (121) received by the diffuser element (410), thereby providing diffused light (411); (E) the beam direction control system (500) is configured in a light receiving relationship with the first light generating arrange-
(Continued)

ment (110) and the second light generating arrangement (120); (G) the control system (300) is configured to control the first light generating arrangement (110), the second light generating arrangement (120), and the beam direction control system (500); and (H) the light generating system (1000) is configured to generate (white) system light (1001).

15 Claims, 6 Drawing Sheets

(51) Int. Cl.
*F21V 9/30* (2018.01)
*G02B 27/28* (2006.01)

111
112
510
520
590

LASER-PHOSPHOR LIGHT SOURCE WITH IMPROVED LIFETIME

CROSS-REFERENCE TO PRIOR APPLICATIONS

This application is the U.S. National Phase application under 35 U.S.C. § 371 of International Application No. PCT/EP2024/050293, filed on Jan. 8, 2024, which claims the benefit of European Patent Application No. 23150835.9, filed on Jan. 10, 2023. These applications are hereby incorporated by reference herein.

FIELD OF THE INVENTION

The invention relates to a light generating system. The invention further relates to a lighting device comprising such light generating system.

BACKGROUND OF THE INVENTION

Laser-phosphor based stage lighting engines are known in the art. For instance, WO2022143318 describes a light emitting device, comprising a first light source, a second light source, a dichroic mirror, a wavelength conversion apparatus, a first light path adjusting apparatus or a second light path adjusting apparatus, and a first scattering optical system. The light mixing effect of emergent light can be improved by using the first scattering optical system. Light emitted by the first light source is all used for exciting the wavelength conversion apparatus.

EP3290992 discloses an illuminator including a first light source unit that outputs first light beams, a second light source unit that outputs second light beams, a polarization combining element that combines the first and second light beams with each other, a polarization state conversion element on which combined light from the polarization combining element is incident, a polarization separation element that separates the combined light having passed through the polarization state conversion element into first light and second light, and a wavelength conversion element that converts the first light into third light. The illuminator outputs the second light and the third light as illumination light. The polarization state conversion element includes a plurality of retardation elements that are separate from one another and arranged in a first direction. The first and second light source units are so configured that a plurality of first regions through which the plurality of first light beams pass and a plurality of second regions through which the plurality of second light beams pass are alternately arranged in the first direction in the polarization state conversion element.

SUMMARY OF THE INVENTION

High brightness light sources can be used in various applications including spots, stage-lighting, headlamps, home and office lighting, and automotive lighting. For this purpose, laser-phosphor technology can be used, wherein a laser provides laser light and a remote phosphor converts laser light into converted light. A relatively straightforward way to produce white light using lasers is to use blue laser light in combination with phosphor converted light to produce white light. There appears to be a desire to provide (white) light with a relatively consistent spectral power distribution over time, even though the light sources generating the (white) light may show a time-dependent power output.

Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

According to a first aspect, the invention provides a light generating system comprising a first light generating arrangement, a second light generating arrangement, a luminescent element, a diffuser element, a beam direction control system, and a control system. In embodiments, the first light generating arrangement may be configured to generate a first beam (B1) of first device light. Especially, the first light generating arrangement may comprise a first solid state (laser) light source. Further, in embodiments the second light generating arrangement may be configured to generate a second beam (B2) of second device light. Especially, the second light generating arrangement may comprise a second solid state (laser) light source. In embodiments, the luminescent element comprises a luminescent material. Especially, the luminescent material may be able to convert the first device light and/or the second device light received by the luminescent material into luminescent material light, Further, in embodiments the diffuser element may be configured to diffuse first device light and/or the second device light received by the diffuser element, thereby providing diffused light. Yet, in embodiments the beam direction control system may be configured in a light receiving relationship with the first light generating arrangement and the second light generating arrangement. In specific embodiments, the beam direction control system may be configured to direct: (a) in a first operational mode of the beam direction control system (i) a first pump part of the first device light and/or the second device light, having a first pump intensity (Ip1), to the luminescent element, and (ii) a first diffuser part of the first device light and/or the second device light, having a first diffuser part intensity (Id1), to the diffuser element; and (b) in a second operational mode of the beam direction control system (i) a second pump part of the first device light and/or the second device light, having a second pump intensity (Ip2), to the luminescent element, and (ii) a second diffuser part of the first device light and/or the second device light, having a second diffuser part intensity (Id2), to the diffuser element. In embodiments, the first pump intensity (Ip1) and the second pump intensity (Ip2) may have different relative contributions of the first device light and/or the second device light. In embodiments, the first diffuser part intensity (Id1) and the second diffuser part intensity (Id2) may have different relative contributions of the first device light and/or the second device light. Especially, in embodiments the control system may be configured to control the first light generating arrangement, the second light generating arrangement, and the beam direction control system. In embodiments, the light generating system is especially configured to generate (white) system light which may comprise the luminescent material light and the diffused light. Therefore, in embodiments the invention provides a light generating system comprising a first light generating arrangement, a second light generating arrangement, a luminescent element, a diffuser element, a beam direction control system, and a control system, wherein: (A) the first light generating arrangement may be configured to generate a first beam (B1) of first device light, wherein the first light generating arrangement may comprise a first solid state laser light source; (B) the second light generating arrangement may be configured to generate a second beam (B2) of second device light, wherein the second light generating arrangement may comprise a second solid state laser light source; (C) the luminescent element may comprise a luminescent material, wherein the luminescent material may be able to convert the first device light and/or the second device light received by the luminescent material into luminescent material light; (D) the diffuser element may be configured to diffuse first device light and/or the second device light received by the diffuser element, thereby providing diffused light; (E) the beam direction control system may be configured in a light receiving relationship with the first light generating arrangement and the second light generating arrangement, and configured to direct: (a) in a first operational mode of the beam direction control system (i) a first pump part of the first device light and/or the second device light, having a first pump intensity (Ip1), to the luminescent element, and (ii) a first diffuser part of the first device light and/or the second device light, having a first diffuser part intensity (Id1), to the diffuser element; and (b) in a second operational mode of the beam direction control system (i) a second pump part of the first device light and/or the second device light, having a second pump intensity (Ip2), to the luminescent element, and (ii) a second diffuser part of the first device light and/or the second device light, having a second diffuser part intensity (Id2), to the diffuser element; (F) the first pump intensity (Ip1) and the second pump intensity (Ip2) may have different relative contributions of the first device light and/or the second device light; and the first diffuser part intensity (Id1) and the second diffuser part intensity (Id2) may have different relative contributions of the first device light and/or the second device light; (G) the control system may be configured to control the first light generating arrangement, the second light generating arrangement, and the beam direction control system; and (H) the light generating system may be configured to generate system light comprising the luminescent material light and the diffused light.

With the invention, amongst others high intensity white light may be provided. Furthermore, the invention may enable generation of high intensity light with a relatively stable color point, even when e.g. one of the light sources degrades over time due to high (power) load. Further, embodiments may allow a relatively safe operation.

As mentioned above, the invention provides a light generating system comprising, in embodiments, a first light generating arrangement, a second light generating arrangement, a luminescent element, a diffuser element, a beam direction control system, and a control system. Here below, embodiments of these elements are described in more detail. The system may comprise a first light generating arrangement and a second light generating arrangement. Each light generating arrangement is configured to generate a beam of light with a respective light source. The respective light sources may especially be solid state light sources, such as lasers, LEDs, and superluminescent diodes. Especially, in embodiments, the light generating arrangement may comprise a laser. Especially, in other embodiments, the light generating arrangement may comprise a superluminescent diode. In other embodiments, the light generating arrangement may comprise a LED. Embodiments of light sources are described below.

The term "light source" may in principle relate to any light source known in the art. It may be a conventional (tungsten) light bulb, a low pressure mercury lamp, a high pressure mercury lamp, a fluorescent lamp, an LED (light emissive diode). In a specific embodiment, the light source comprises a solid state LED light source (such as an LED or laser diode (or "diode laser")). The term "light source" may also relate to a plurality of light sources, such as 2-2000 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light emitting semiconductor light source may be configured on the same substrate. In embodiments, a COB is a multi LED chip configured together as a single lighting module. The light source may have a light escape surface. Referring to conventional light sources such as light bulbs or fluorescent lamps, it may be an outer surface of a glass or a quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

Likewise, a light generating device may comprise a light escape surface, such as an end window. Further, likewise a light generating system may comprise a light escape surface, such as an end window.

The term "light source" may refer to a semiconductor light-emitting device, such as a light emitting diode (LEDs), a resonant cavity light emitting diode (RCLED), a vertical cavity laser diode (VCSELs), an edge emitting laser, etc., The term "light source" may also refer to an organic light-emitting diode (OLED), such as a passive-matrix (PMOLED) or an active-matrix (AMOLED). In a specific embodiment, the light source comprises a solid-state light source (such as an LED or laser diode). In an embodiment, the light source comprises an LED (light emitting diode). The terms "light source" or "solid state light source" may also refer to a superluminescent diode (SLED).

The term LED may also refer to a plurality of LEDs.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as an LED, or downstream of a plurality of solid-state light sources (i.e. e.g. shared by multiple LEDs). In embodiments, the light source may comprise an LED with on-chip optics. In embodiments, the light source comprises pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as an LED with a luminescent material layer or dome comprising luminescent material. Such LEDs may be indicated as phosphor converted LEDs or PC LEDs (phosphor converted LEDs). In other embodiments, the luminescent material may be configured at some distance ("remote") from the light source, such as an LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED. The light source may especially be configured to generate light source light having an optical axis (O), (a beam shape,) and a spectral power distribution. The light source light may in embodiments comprise one or more bands, having band widths as known for lasers.

The term "light source" may (thus) refer to a light generating element as such, like e.g. a solid state light source, or e.g. to a package of the light generating element, such as a solid state light source, and one or more of a luminescent material comprising element and (other) optics, like a lens, a collimator. A light converter element ("converter element" or "converter") may comprise a luminescent material comprising element. For instance, a solid state light source as such, like a blue LED, is a light source. A combination of a solid state light source (as light generating element) and a light converter element, such as a blue LED and a light converter element, optically coupled to the solid state light source, may also be a light source (but may also be indicated as light generating device). Hence, a white LED is a light source (but may e.g. also be indicated as (white) light generating device).

The term "light source" herein may also refer to a light source comprising a solid state light source, such as an LED or a laser diode or a superluminescent diode.

The term "light source" may (thus) in embodiments also refer to a light source that is (also) based on conversion of light, such as a light source in combination with a luminescent converter material. Hence, the term "light source" may also refer to a combination of an LED with a luminescent material configured to convert at least part of the LED radiation, or to a combination of a (diode) laser with a luminescent material configured to convert at least part of the (diode) laser radiation.

In embodiments, the term "light source" may also refer to a combination of a light source, like an LED, and an optical filter, which may change the spectral power distribution of the light generated by the light source. Especially, the term "light generating device" may be used to address a light source and further (optical components), like an optical filter and/or a beam shaping element, etc.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The term "solid state light source", or "solid state material light source", and similar terms, may especially refer to semiconductor light sources, such as a light emitting diode (LED), a diode laser, or a superluminescent diode.

The term "laser light source" especially refers to a laser. Such a laser may especially be configured to generate device light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" or "solid state material laser" may refer to one or more of cesium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride (Sm:CaF2) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate Nd:Yca4O(BO3)3 or Nd:YCOB, neodymium doped yttrium orthovanadate (Nd:YVO4) laser, neodymium glass (Nd:glass) laser, neodymium YLF (Nd:YLF) solid-state laser, promethium 147 doped phosphate glass (147Pm3+:glass) solid-state laser, ruby laser (Al2O3:Cr3+), thulium YAG (Tm:YAG) laser, titanium sapphire (Ti:sapphire; Al2O3:Ti3+) laser, trivalent uranium doped calcium fluoride (U:CaF2) solid-state laser, Ytterbium doped glass laser (rod, plate/chip, and fiber), Ytterbium YAG (Yb:YAG) laser, Yb2O3 (glass or ceramics) laser, etc.

For instance, including second and third harmonic generation embodiments, the light source may comprise one or more of an F center laser, an yttrium orthovanadate (Nd:YVO4) laser, a promethium 147 doped phosphate glass ($147Pm^{3+}$:glass), and a titanium sapphire (Ti:sapphire; $Al_2O_3$:$Ti^{3+}$) laser. For instance, considering second and third harmonic generation, such light sources may be used to generated blue light.

In embodiments, the terms "laser" or "solid state laser" or "solid state material laser" may refer to one or more of a semiconductor laser diodes, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light. Hence, in embodiments lasers in a laser bank (or "laser array bank") may share the same optics.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The laser light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments ≤2° (FWHM), more especially ≤1° (FWHM), most especially ≤0.5° (FWHM). Hence, ≤2° (FWHM) may be considered (highly) collimated light source light. Optics may be used to provide (high) collimation (see also above).

The term "solid state material laser", and similar terms, may refer to a solid state laser like based on a crystalline or glass body dopes with ions, like transition metal ions and/or lanthanide ions, to a fiber laser, to a photonic crystal laser, to a semiconductor laser, such as e.g. a vertical cavity surface-emitting laser (VCSEL), etc.

The term "solid state light source", and similar terms, may especially refer to semiconductor light sources, such as a light emitting diode (LED), a diode laser, or a superluminescent diode. Instead of the term "solid state light source" also the term "semiconductor-based light source" may be applied. Hence, the term "semiconductor-based light source" may e.g. refer to one or more of a light emitting diode (LED), a diode laser, and a superluminescent diode. Hence, the light generating device may comprise one or more of a light emitting diode (LED), a diode laser, and a superluminescent diode.

Superluminescent diodes are known in the art. A superluminescent diode may be indicated as a semiconductor device which may be able to emit low-coherence light of a broad spectrum like an LED, while having a brightness in the order of a laser diode.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments ≤2° (FWHM), more especially ≤1° (FWHM), most especially ≤0.5° (FWHM). Hence, ≤2° (FWHM) may be considered (highly) collimated light source light. Optics may be used to provide (high) collimation (see also above).

The term "solid state material laser", and similar terms, may refer to a solid state laser like based on a crystalline or glass body dopes with ions, like transition metal ions and/or lanthanide ions, to a fiber laser, to a photonic crystal laser, to a semiconductor laser, such as e.g. a vertical cavity surface-emitting laser (VCSEL), etc.

The term "solid state light source", and similar terms, may especially refer to semiconductor light sources, such as a light emitting diode (LED), a diode laser, or a superluminescent diode. Instead of the term "solid state light source" also the term "semiconductor-based light source" may be applied. Hence, the term "semiconductor-based light source" may e.g. refer to one or more of a light emitting diode (LED), a diode laser, and a superluminescent diode. Hence, the light generating device may comprise one or more of a light emitting diode (LED), a diode laser, and a superluminescent diode.

Superluminescent diodes are known in the art. A superluminescent diode may be indicated as a semiconductor device which may be able to emit low-coherence light of a broad spectrum like an LED, while having a brightness in the order of a laser diode.

US2020192017 indicates for instance that "With current technology, a single SLED is capable of emitting over a bandwidth of, for example, at most 50-70 nm in the 800-900 nm wavelength range with sufficient spectral flatness and sufficient output power. In the visible range used for display applications, i.e. in the 450-650 nm wavelength range, a single SLED is capable of emitting over bandwidth of at most 10-30 nm with current technology. Those emission bandwidths are too small for a display or projector application which requires red (640 nm), green (520 nm) and blue (450 nm), i.e. RGB, emission". Further, superluminescent diodes are amongst others described, in "Edge Emitting Laser Diodes and Superluminescent Diodes", Szymon Stanczyk, Anna Kafar, Dario Schiavon, Stephen Najda, Thomas Slight, Piotr Perlin, Book Editor(s): Fabrizio Roccaforte, Mike Leszczynski, First published: 3 Aug. 2020 https://doi.org/10.1002/9783527825264.ch9 in chapter 9.3 superluminescent diodes. This book, and especially chapter 9.3, are herein incorporated by reference. Amongst others, it is indicated therein that the superluminescent diode (SLD) is an emitter, which combines the features of laser diodes and light-emitting diodes. SLD emitters utilize the stimulated emission, which means that these devices operate at current densities similar to those of laser diodes. The main difference between LDs and SLDs is that in the latter case, the device waveguide may be designed in a special way preventing the formation of a standing wave and lasing. Still, the presence of the waveguide ensures the emission of a high-quality light beam with high spatial coherence of the light, but the light is characterized by low time coherence at the same time" and "Currently, the most successful designs of nitride SLD are bent, curved, or tilted waveguide geometries as well as tilted facet geometries, whereas in all cases, the front end of the waveguide meets the device facet in an inclined way, as shown in FIG. 9.10. The inclined waveguide suppresses the reflection of light from the facet to the waveguide by directing it outside to the lossy unpumped area of the device chip". Hence, an SLD may especially be a semiconductor light source, where the spontaneous emission light is amplified by stimulated emission in the active region of the device. Such emission is called "super luminescence". Superluminescent diodes combine the high power and brightness of laser diodes with the low coherence of conventional light-emitting diodes. The low (temporal) coherence of the source has advantages that the speckle is significantly reduced or not visible, and the spectral distribution of emission is much broader compared to laser diodes, which can be better suited for lighting applications. Especially, with varying electrical current, the spectral power distribution of the superluminescent diode may vary. In this way the spectral power distribution can be controlled, see e.g. also Abdullah A. Alatawi, et al., Optics Express Vol. 26, Issue 20, pp. 26355-26364, https://doi.org/10.1364/OE.26.026355.

The respective light sources of the first light generating arrangement and the second light generating arrangement may especially essentially be the same, like two solid state light sources of the same bin. In specific embodiments, the device light generated by the respective light generating arrangements may have essentially the same color point.

In other specific embodiments, colors or color points of a first type of light and a second type of light may be essentially the same when the respective color points of the first type of light and the second type of light differ with at maximum 0.03 for u' and/or with at maximum 0.03 for v', even more especially at maximum 0.02 for u' and/or with at maximum 0.02 for v'. In yet more specific embodiments, the respective color points of first type of light and the second type of light may differ with at maximum 0.01 for u' and/or with at maximum 0.01 for v'. Here, u' and v' are color coordinate of the light in the CIE 1976 UCS (uniform chromaticity scale) diagram. The color points indicated with u',v' especially refer to the CIE 1976 color points (see ISO CIE 11664-5: Colorimetry—Part5: CIE 1976 L*u*v* color space and u', v' uniform chromaticity scale diagram).

Each light generating arrangement comprises a light generating device. The light generating device is especially configured to generate device light. The (respective) light generating device may comprise the (respective) light source (especially solid state light source).

In embodiments, the first light generating arrangement comprises a first (solid state (laser)) light source (configured to generate first (solid state (laser)) light source light). In embodiments, the first device light comprises the first light source light. In other embodiments, the first device light may consist of the first light source light. In yet other embodiments, the first device light comprises converted first (solid state (laser)) light source light, as the first light generating device may comprise a luminescent material configured to convert at least part of the first (solid state (laser)) light source light into luminescent material light (for luminescent materials, see also above (and below)). Hence, the first device light may comprise luminescent material light. The first device light may be laser light (see also examples above). As can be derived from the above, the terms "first light source" and "first light generating device" may also refer to a plurality of (essentially the same) first light sources and a plurality of (essentially the same) light generating devices, respectively. In specific embodiments, the first light generating arrangement comprises laser bank comprising a plurality of first (solid state) laser light sources.

In embodiments, the second light generating arrangement comprises a second (solid state (laser)) light source (configured to generate second (solid state (laser)) light source light). In embodiments, the second device light comprises the second light source light. In other embodiments, the second device light may consist of the second light source light. In yet other embodiments, the second device light comprises converted second (solid state (laser)) light source light, as the second light generating device may comprise a luminescent material configured to convert at least part of the second (solid state (laser)) light source light into luminescent material light (for luminescent materials, see also above (and below)). Hence, the second device light may comprise luminescent material light. The second device light may be laser light (see also examples above). As can be derived from the above, the terms "second light source" and "second light generating device" may also refer to a plurality of (essentially the same) second light sources and a plurality of (essentially the same) light generating devices, respectively. In specific embodiments, the second light generating arrangement comprises laser bank comprising a plurality of second (solid state) laser light sources.

Herein, the term arrangement is applied as the arrangement may in embodiments not be a sole (solid state) light source, but may comprise more components. The following embodiments may individually apply to the first light generating arrangement and the second light generating arrangement.

In embodiments, the light generating arrangement may comprise a laser bank. Hence, the light generating arrangement may comprise a plurality of (solid state) laser light sources, such as especially laser diodes.

In embodiments, the light generating arrangement may (further) comprise optics, to beam shape the device light and/or to homogenize the device light (of a plurality of light generating devices). Especially, the optics may be configured to provide the beam of device light, which may be relatively more collimated downstream of the optics than upstream of the optics. These optics may thus be configured downstream of the light generating device, and may be considered to be comprised in the light generating arrangement.

In embodiments, the light generating arrangement may comprise a polarizer element. The polarizer element may be applied to (further) polarize the device light of the light generating device. In specific embodiments, the polarizer element may be controllable, such that in a first configuration a polarization is maintained or imposed, and in a second configuration, another polarization is imposed. For instance, unpolarized light may be converted into p polarized light in the first configuration, or p-polarized light may stay p-polarized light in the first configuration, and in the second configuration unpolarized light may be converted into s-polarized light, or p-polarized light may be converted into s-polarized light, respectively. This polarizer element may thus be configured downstream of the light generating device, and may be considered to be comprised in the light generating arrangement.

Note that a controllable polarizer element may alternatively be considered to be comprised by the beam direction control system, as the polarization of the device light may dictate the optical path of the device light (see also below). For instance, polarization may be controlled with a retarder, such as especially a $\lambda/2$ retarder.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

Hence, in specific embodiments the first light generating arrangement may be configured to generate a first beam (B1) of first device light, wherein the first light generating arrangement may comprise a first solid state laser light source. Alternatively or additionally, in specific embodiments (also) the second light generating arrangement may be configured to generate a beam (B2) of second device light, wherein the second light generating arrangement may comprise a second solid state laser light source.

Herein, the term "device light" may be used in general to refer to (embodiments of the) first device light and/or second device light.

In embodiments, the system light comprises a contribution of non-converted light and a contribution of converted light. Hence, the system may also comprise a luminescent material. This luminescent material may be comprised by a luminescent element. The luminescent element may comprise a layer. Alternatively (or additionally), the luminescent element may comprise a luminescent body (such as for instance a single crystalline body or a ceramic body).

The luminescent body may have any shape. In general, however, the luminescent body may comprise two essentially parallel faces, defining a height (of the luminescent body). Further, the luminescent body may comprise an edge face, bridging the two essentially parallel faces. The edge face may be curved in one or two dimensions. The edge face may be planar. The luminescent body may have a rectangular or circular cross-section, though other cross-sections may also be possible, like e.g. hexagonal, octagonal, etc. Hence, the luminescent body may have a circular cross-section, an oval cross-section, square, or non-square rectangular. In embodiments, the luminescent body may have an n-gonal cross-section, wherein n is at least 3, like 4 (square or rectangular cross-section), 5 (pentagonal cross-section), 6 (hexagonal cross-section), 8 (octagonal cross-section) or higher. The two essentially parallel faces may also be indicated as "main faces", as they may especially provide the largest external area of the luminescent body. Perpendicular to the afore-mentioned cross-section, may be another cross-section, which may in embodiments be rectangular. Hence, the luminescent body may e.g. have a cubic shape, a (non-cubic) cuboid shape, an n-gonal prism shape with n being at least 5 (such as pentagonal prism, hexagonal prism), and a cylindrical shape. Other shapes, however, may also be possible. Especially, the luminescent body may have a cuboid shape, a cylindrical shape, or an n-gonal prism shape wherein n is 6 or 8.

In embodiments, the luminescent body (or "body") has lateral dimensions width or length (W1 or L1) or diameter (D) and a thickness or height (H1). In embodiments, (i) D≥H1 or (ii) and W1≥H1 and/or L1≥H1. The luminescent body may be transparent or light scattering. In embodiments, the luminescent body may comprise a ceramic luminescent material. In specific embodiments, L1≤10 mm, such as especially L1≤5 mm, more especially L1≤3 mm, most especially L1≤2 mm. In specific embodiments, W1≤10 mm, such as especially W1≤5 mm, more especially W1≤3 mm, most especially W1≤2 mm. In specific embodiments, H1≤10 mm, such as especially H1≤5 mm, more especially H1≤3 mm, most especially H1≤2 mm. In specific embodiments, D≤10 mm, such as especially D≤5 mm, more especially D≤3 mm, most especially D≤2 mm. In specific embodiments, the body may have in embodiments a thickness in the range 50 μm-1 mm. Further, the body may have lateral dimensions (width/diameter) in the range 100 μm-10 mm. In yet further specific embodiments, (i) D>H1 or (ii) W1>H1 and L1>H1. Especially, the lateral dimensions like length, width, and diameter are at least 2 times, like at least 5 times, larger than the height. In specific embodiments, the luminescent body has a first length L1, a first height H1, and a first width W1, wherein H1≤0.5*L1 and H1≤0.5*W1. In embodiments, the luminescent body may be a (small) tile. In embodiments, the luminescent body (200) may comprises a first face (201), a second face (202), and a side face (203) bridging the first face (201) and the second face (202). The first face and the second face may also be indicated as main faces. In the case of a cylindrical shape, the side face may be a single side face. In the case of a cuboid, the side face may comprise four facets. In the case of a hexagonal prism the side face may comprise six facets.

The luminescent element may especially be configured downstream of the first light generating arrangement and/or the second light generating arrangement. The downstream configuration relative to the first light generating arrangement and/or second light generating arrangement may depend upon the operational mode (see also below); i.e. whether a specific arrangement of the luminescent element is downstream of the first light generating arrangement or second light generating arrangement may depend upon the operational mode, as in one operational mode the luminescent element may receive device light from one of the light generating devices, and in another operational mode, the luminescent element may receive device light from another one of the light generating devices. Note that in embodiments it is receiving device light either from the first light generating device or from the second light generating device; however, herein embodiments are not excluded wherein in an operational mode the luminescent element may receive device light from both light generating arrangements.

The luminescent material may especially be able to convert first device light (when) received by the luminescent material or second device light (when) received by the luminescent material, or a combination thereof, would a combination be received by the luminescent material. Hence, in embodiments the luminescent element may comprise a luminescent material, wherein the luminescent material may be able to convert the first device light and/or the second device light received by the luminescent material into luminescent material light. Here below, some embodiments in relation to the luminescent material are described.

The term “luminescent material” especially refers to a material that can convert first radiation, especially one or more of UV radiation and blue radiation, into second radiation. In general, the first radiation and second radiation have different spectral power distributions. Hence, instead of the term “luminescent material”, also the terms “luminescent converter” or “converter” may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the “luminescent material” may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}>\lambda_{em}$).

In embodiments, the term “luminescence” may refer to phosphorescence. In embodiments, the term “luminescence” may also refer to fluorescence. Instead of the term “luminescence”, also the term “emission” may be applied. Hence, the terms “first radiation” and “second radiation” may refer to excitation radiation and emission (radiation), respectively. Likewise, the term “luminescent material” may in embodiments refer to phosphorescence and/or fluorescence.

The term “luminescent material” may also refer to a plurality of different luminescent materials. Examples of possible luminescent materials are indicated below. Hence, the term “luminescent material” may in specific embodiments also refer to a luminescent material composition. Instead of the term “luminescent material” also the term “phosphor” may be applied. These terms are known to the person skilled in the art.

In embodiments, luminescent materials are selected from garnets and nitrides, especially doped with trivalent cerium or divalent europium, respectively. The term “nitride” may also refer to oxynitride or nitridosilicate, etc. Alternatively or additionally, the luminescent material(s) may be selected from silicates, especially doped with divalent europium.

In specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B may comprise aluminum (Al); however, in addition to aluminum, B may also partly comprise gallium (Ga) and/or scandium (Sc) and/or indium (In), especially up to about 20% of B, more especially up to about 10% of B (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term “:Ce”, indicates that part of the metal ions (i.e. in the garnets: part of the “A” ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein $x1+x2+x3=1$, wherein $x3>0$, wherein $0<x2+x3\leq 0.2$, wherein $y1+y2=1$, wherein $0\leq y2\leq 0.2$, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially $x1>0$, such as $>0.2$, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (optionally in combination with (the) light of other sources of light as described herein). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein $0<x2+x3\leq 0.1$, and wherein $0\leq y2\leq 0.1$. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein $x1+x3=1$, and wherein $0<x3\leq 0.2$, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga, In and Sc, wherein x1+x2+x3=1, wherein x3>0, wherein 0<x2+x3≤0.2, wherein y1+y2=1, wherein 0≤y2≤0.2. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

Alternatively or additionally, wherein the luminescent material may comprises a luminescent material of the type $A_3Si_6N_{11}:Ce^{3+}$, wherein A comprises one or more of Y, La, Gd, Tb and Lu, such as in embodiments one or more of La and Y.

In embodiments, the luminescent material may alternatively or additionally comprise one or more of $MS:Eu^{2+}$ and/or $M_2S_{15}N_8:Eu^{2+}$ and/or $MalSiN_3:Eu^{2+}$ and/or $Ca_2AlSi_3O_2N_5:Eu^{2+}$, etc., wherein M comprises one or more of Ba, Sr and Ca, especially in embodiments at least Sr. Hence, in embodiments, the luminescent may comprise one or more materials selected from the group consisting of (Ba,Sr,Ca)S:Eu, (Ba,Sr,Ca)$AlSiN_3$:Eu and (Ba,Sr,Ca)$_2Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba. The material (Ba,Sr,Ca) S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material (Ba,Sr,Ca)$_2Si_5N_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca). Likewise, the material (Ba,Sr,Ca)$AlSiN_3$:Eu can also be indicated as $MalSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, (Ba,Sr,Ca)$AlSiN_3$:Eu and (Ba,Sr,Ca)2$Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material (Ba,Sr,Ca)$_2Si_5N_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca).

Likewise, the material (Ba,Sr,Ca) $AlSiN_3$:Eu can also be indicated as $MalSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO ($Y_2SiO_5:Ce^{3+}$), or similar compounds, or BAM ($BaMgAl_{10}O_{17}:Eu^{2+}$), or similar compounds.

A red luminescent material that may (also) be applied may comprise $M'_xM_{2-2x}AX_6$ doped with tetravalent manganese, wherein M' comprises an alkaline earth cation, wherein M comprises a cation, and x is in the range of 0-1, wherein A comprises a tetravalent cation, wherein X comprises a monovalent anion, at least comprising fluorine.

The term "luminescent material" herein especially relates to inorganic luminescent materials.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nanowires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

Luminescent material light that is provided by the luminescent element may be at least partly diffused (luminescent material) light. As the system light may in embodiments also comprise unconverted light source light, it may be desirable to have also the unconverted light be diffused light. This may also in embodiments reduce speckle. Further, when using lasers, diffused (laser) light may be desired for possibly enhancing safety. Hence, in embodiments the system may comprise a diffuser element, wherein especially the diffuser element may be configured to diffuse first device light and/or the second device light received by the diffuser element, thereby providing diffused light.

The diffuser element is especially configured downstream of the first light generating arrangement and/or the second light generating arrangement. The downstream configuration relative to the first light generating arrangement and/or second light generating arrangement may depend upon the operational mode (see also below); i.e. whether a specific arrangement of the diffuser element is downstream of the first light generating arrangement or second light generating arrangement may depend upon the operational mode, as in one operational mode the diffuser element may receive device light from one of the light generating devices, and in another operational mode, the diffuser element may receive device light from another one of the light generating devices. Note that in embodiments it is receiving device light either from the first light generating device or from the second light generating device; however, herein embodiments are not excluded wherein in an operational mode the diffuser element may receive device light from both light generating arrangements.

The diffuser element may especially be able to diffuse first device light (when) received by the diffuser element or second device light (when) received by the 1 diffuser element, or a combination thereof, would a combination be received by the diffuser element. Hence, in embodiments the diffuser element may be able to diffuse the first device light and/or the second device light received by the diffuser element. Hence, device light diffused at the diffuser element, and propagating away from the diffuser element, may be less collimated than device light propagating to the diffuser element.

As indicated above, the diffuser element may be configured to diffuse device light received by the diffuser element, thereby providing diffused light. This diffused light may be polarized but is not necessarily polarized. Especially, when using a transmissive mode, it may not be a problem that the diffused light is not polarized. However, when a reflective mode is applied, it may be desirable to use a diffuser element which is configured to diffuse the device light received while at least part of the polarization is maintained. Hence, in embodiments, especially in the reflective mode, the diffuser element may comprise a polarization maintaining diffuser element. Polarization maintaining diffuser elements are known in the art, and are e.g. described in U.S. Pat. No. 5,963,284, which is herein incorporated by reference.

Especially, the beam direction control system may allow a choice between two configurations. For instance, this may in embodiments imply that in a first operational mode more light of one of the light generating devices, or all light of that light generating device, is received by the luminescent element, and more light of the other one of the light generating devices, or all light of that (other) light generating device is received by the diffuser element, whereas in a second operational mode more light of the other one of the light generating devices, or all light of that light generating device, is received by the luminescent element, and more light of the one of the light generating devices, or all light of that light generating device is received by the diffuser element. This may imply that in embodiments in both operational modes the same spectral power distribution of the system light may be obtained. This may also imply that, e.g., when execution of the first operational mode over time leads to degradation of one of the light generating devices, in the second operational mode the direction of the device light of the respective light generating devices may essentially be swapped. Hence, switching to another operational mode (of the two operational modes) may lead to the direction of the device light of the respective light generating devices essentially being swapped. For instance, when one of the light generating devices is operated at maximum power, or close thereby, such as 90-100% of maximum power, it may degrade faster than the other one or the light generating devices, which may e.g. be operated at 5-90%, such as 5-75% of the maximum power. When switching the operational mode after some operation time, it is e.g. possible to start again at maximum power. In this way, the lifetime of the system may be prolonged. Hence, the beam direction control system may be configured to receive device light from the first light generating arrangement and the second light generating arrangement, and configured to distribute the received device light over the luminescent element and the diffuser element.

Hence, in embodiments the beam direction control system may be configured in a light receiving relationship with the first light generating arrangement and the second light generating arrangement, and be configured to direct: (a) in a first operational mode of the beam direction control system (i) a first pump part of the first device light and/or the second device light, having a first pump intensity (Ip1), to the luminescent element, and (ii) a first diffuser part of the first device light and/or the second device light, having a first diffuser part intensity (Id1), to the diffuser element; and (b) in a second operational mode of the beam direction control system (i) a second pump part of the first device light and/or the second device light, having a second pump intensity (Ip2), to the luminescent element, and (ii) a second diffuser part of the first device light and/or the second device light, having a second diffuser part intensity (Id2), to the diffuser element.

Therefore, in the first operational mode the luminescent element may receive light with a first pump intensity (Ip1), which light may comprise first device light and or second device light (in specific embodiments essentially only one of these; see also below). Further, in the first operational mode the diffuser element may receive light with a first diffuser part intensity (Id1), which light may comprise first device light and or second device light (in specific embodiments essentially only one of these; see also below). Likewise, in the second operational mode the luminescent element may receive light with a second pump intensity (Ip2), which light may comprise first device light and or second device light (in specific embodiments essentially only one of these; see also below). Further, in the second operational mode the diffuser element may receive light with a second diffuser part intensity (Id1), which light may comprise first device light and or second device light (in specific embodiments essentially only one of these; see also below).

However, the ratio of the percentages of the first device light and the second device light in first pump intensity (Ip1) and the second pump intensity (Ip2) may differ, like e.g. first device light may provide >50% and second device light may provide <50% of the first pump intensity (Ip1) in the first operational mode, and first device light may provide <50% and second device light may provide >50% of the second pump intensity (Ip2) in the second operational mode. More especially, in embodiments the first device light may provide 100% and the second device light may provide 0% of the first pump intensity (Ip1) in the first operational mode, and the first device light may provide 0% and the second device light may provide 100% of the second pump intensity (Ip2) in the second operational mode.

Likewise, the ratio of the percentages of the first device light and the second device light in first diffuser part intensity (Id1) and the second diffuser part intensity (Id2) may differ, like e.g. first device light may provide <50% and second device light may provide >50% of the first diffuser part intensity (Id1) in the first operational mode, and first device light may provide >50% and second device light may provide <50% of the second diffuser part intensity (Id2) in the second operational mode. More especially, in embodiments the first device light may provide 0% and the second device light may provide 100% of the first diffuser part intensity (Id1) in the first operational mode, and the first device light may provide 100% and the second device light may provide 0% of the second diffuser part intensity (Id2) in the second operational mode.

Therefore, in embodiments one or more, especially both of the following may apply: (a) the first pump intensity (Ip1) and the second pump intensity (Ip2) have different relative contributions of the first device light (111) and/or the second device light (121), and (b) the first diffuser part intensity (Id1) and the second diffuser part intensity (Id2) have different relative contributions of the first device light and/or the second device light.

As can be derived from the above, in embodiments in either operational mode the device light received by the luminescent element and the device light received by the diffuser element are selected from either the first device light or the second device light, i.e. essentially (in a single point in time) the luminescent element either receives the first device light or the second device light (but not parts of both), and the diffuser element either receives the second device light or the first device light (but not parts of both). As indicated above, especially the first device light and second device light are laser light.

Hence, in specific embodiments the beam direction control system may be configured to direct: (a) in the first operational mode of the beam direction control system (i) first device light, having the first pump intensity (Ip1), to the luminescent element, and (ii) second device light, having the first diffuser part intensity (Id1), to the diffuser element; and (b) in the second operational mode of the beam direction control system (i) second device light, having the second pump intensity (Ip2), to the luminescent element, and (ii) first device light, having the second diffuser part intensity (Id2), to the diffuser element.

Note that terms like first and second may especially indicate different types, or may be used to indicated different aspects, or may refer to similar elements at different positions, etc. The terms first operational mode and second operational mode do not necessarily indicate a specific order.

Hence, definitions like "(a) in the first operational mode of the beam direction control system (i) first device light, having the first pump intensity (Ip1), to the luminescent element, and (ii) second device light, having the first diffuser part intensity (Id1), to the diffuser element; and (b) in the second operational mode of the beam direction control system (i) second device light, having the second pump intensity (Ip2), to the luminescent element, and (ii) first device light, having the second diffuser part intensity (Id2), to the diffuser element" may equally well different be defined, without deviating from the invention, such as "(a) in the first operational mode of the beam direction control system (i) first device light, having the first diffuser part intensity (Id1), to the diffuser element, and (ii) second device light, having the first pump intensity (Ip1), to the luminescent element; and (b) in the second operational mode of the beam direction control system (i) second device light, having the second diffuser part intensity (Ip2), to the diffuser element, and (ii) first device light, having the second pump intensity (Ip2), to the luminescent element."

Here below, in the table, two examples of sets of operational modes are provided. In the first example in the table, in the first operational mode, the first pump part intensity received by the luminescent element is mainly provided by the first device light, but 25% of the power may be provided by the second device light. These percentage should especially add up to 100%. In the first example, in the first operational mode, the first diffuser part intensity received by the diffuser element is mainly provided by the second device light, but 25% of the power may be provided by the first device light. These percentage should especially add up to 100%.

Note that spectral powers provided by the first device and the second device are not necessarily equal. Hence, though the percentage of the first device light received by luminescent element, i.e. 75%, and the percentage of the first device light received by the diffuser element, i.e. 25%, in this example 1 add also up to 100%, that is not necessarily the case.

In the first example in the table, in the second operational mode, the first pump part intensity received by the luminescent element is for 25% provided by the first device light, and 75% of the power may be provided by the second device light. In the first example, in the second operational mode, the first diffuser part intensity received by the diffuser element is for 75% provided by the first device light, and 25% of the power may be provided by the second device light.

In the second example in the table, in the first operational mode, the first pump part intensity received by the luminescent element is solely provided by the first device light, without any contribution provided by the second device light. In the second example, in the first operational mode, the first diffuser part intensity received by the diffuser element is solely provided by the second device light, without any contribution provided by the first device light.

In the second example in the table, in the second operational mode, the first pump part intensity received by the luminescent element is solely provided by the second device light, without any contribution provided by the first device light. In the second example, in the second operational mode, the first diffuser part intensity received by the diffuser element is for solely provided by the first device light, without any contribution provided by the second device light.

| | | Ip | | Id | |
|---|---|---|---|---|---|
| Ex | | $1^{st}$ device light | $2^{nd}$ device light | $1^{st}$ device light | $2^{nd}$ device light |
| 1 | $1^{st}$ op. mode | 0.75 * Ip1 | 0.25 * Ip1 | 0.25 * Id1 | 0.75 * Id1 |
| | $2^{nd}$ op. mode | 0.25 * Ip2 | 0.75 * Ip2 | 0.75 * Id2 | 0.25 * Id2 |
| 2 | $1^{st}$ op. mode | Ip1 | — | — | Id1 |
| | $2^{nd}$ op. mode | — | Ip2 | Id2 | — |

Hence, the phrase "first pump part of the first device light and/or the second device light" may refer to a percentage between 0-100% of the first device light and a percentage of 0-100% of the second device light, but at least is not 0% (see also examples 1 and 2 in above table). In specific embodiments, the phrase may refer to 100% first device light, and no second device light, or 100% second device light, and not first device light (see example 2 in above table). Further, the term "first pump part" refers to a part of the device light of the first light generating arrangement and/or the second light generating arrangement, which propagates to the luminescent element.

Likewise, the phrase "first diffuser part of the first device light and/or the second device light" may refer to a percentage between 0-100% of the first device light and a percentage of 0-100% of the second device light, but at least is not 0% (see also examples 1 and 2 in above table). In specific embodiments, the phrase may refer to 100% first device light, and no second device light, or 100% second device light, and not first device light (see example 2 in above table). Further, the term "first diffuser part" refers to a part of the device light of the first light generating arrangement and/or the second light generating arrangement, which propagates to the diffuser element.

Intensities may especially be defined in terms of radiant flux or radiant power (Watt).

As indicated above, the system may further comprise a control system. Especially, the control system may be configured to control the system light. Controlling the system light may comprise controlling which device light is provided to the luminescent element and/or which device light is provided to the diffuser element. Controlling may also imply controlling the power of the device light provided to the luminescent element and/or the power of the device light provided to the diffuser element. In this way, e.g. also the spectral power distribution of the system light may be controlled. Especially, the control system may be configured to control the first light generating arrangement, the second light generating arrangement, and the beam direction control system.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc., Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions from a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, Thread, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, which can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Further, in embodiments the light generating system may be configured to generate system light comprising the luminescent material light and the diffused light. Especially, the system light may have one or more wavelengths in the visible wavelength range. More especially, the system light may be white light. However, in other embodiments the system light may be colored light.

The term "white light", and similar terms, herein, is known to the person skilled in the art. It may especially relate to light having a correlated color temperature (CCT) between about 1800 K and 20000 K, such as between 2000 and 20000 K, especially 2700-20000 K, for general lighting especially in the range of about 2000-7000 K, such as in the range of 2700 K and 6500 K. In embodiments, e.g. for backlighting purposes, or for other purposes, the correlated color temperature may especially be in the range of about 7000 K and 20000 K. Yet further, in embodiments the correlated color temperature is especially within about 15 SDCM (standard deviation of color matching) from the BBL (black body locus), especially within about 10 SDCM from the BBL, even more especially within about 5 SDCM from the BBL.

In specific embodiments, the correlated color temperature may be selected from the range of 6000-12000 K, like selected from the range of 7000-12000 K, like at least 8000 K. Yet further, in embodiments the correlated color temperature (may be selected from the range of 6000-12000 K, like selected from the range of 7000-12000 K, in combination with a CRI of at least 70.

The terms "visible", "visible light" or "visible emission" and similar terms refer to light having one or more wavelengths in the range of about 380-780 nm. Herein, UV may especially refer to a wavelength selected from the range of 190-380 nm, such as 200-380 nm.

Hence, in specific embodiments the system light is white system light. Herein, in in specific embodiments the system light may have a correlated color temperature selected from the range of 6000-10,000 K.

Especially, the first device light and the second device light may propagate in such a way that at a position within the system they have a mutual angle of 90°. More especially, with an optical element (see also below), comprised by the beam direction control system, the beam of first device light and the optical element may have a first mutual angle of 45°, and the beam of second device light and the optical element may have a second mutual angle of 45°. Further, the beam of first device light and the beam of second device light may have a mutual angle of 90°. The optical element may be configured between the two beams of device light propagating from the respective light generating devices to the optical element. When there is an operational mode wherein both beams are reflected by the optical element and another operational mode wherein both beams are transmitted through the optical element or transmitted through a space where the optical element was configured in the former operational mode, then the two operational modes may provide modes wherein the contributions of the device light received at the luminescent element may be swapped and/or wherein the contributions of the device light received at the diffuser element may be swapped; see further also below. Hence, in an operational mode both beams may be reflected at the optical element in a control region (see also below), and in another operational mode both beams may propagate through the control region (essentially without any (substantial) deflection), as the optical element has become transmissive for both beams of light, or is removed from the control region. The former mode may also be indicated as reflective mode, and the latter mode may also be indicated as transmissive mode.

Especially, the optical element may be a substantially planar optical element, like a substantially planar specular mirror or a substantially planar reflective polarizer (or a reflective polarizing beam splitter). Such optical element may comprise two (major) faces, which may be configured parallel. In one of the operational modes, first device light may irradiate one of these major faces, and second device light may irradiate the other one of these major faces. Especially, the two beams may have mutual angle of 90°, with the optical element configured in between (in at least one of the operational modes). Hence, the beam of first device light and the optical element may have a first mutual angle of 45° (with one of the two opposite faces), and the beam of second device light and the optical element may have a second mutual angle of 45° (with the other one of the two opposite faces).

Therefore, in specific embodiments the beam direction control system may comprise a control region, wherein during operation of the light generating system first device light and second device light may propagate through the control region under a first mutual angle ($\alpha 1$), wherein especially $\alpha 1=90°$. The control region may be a 3D space, wherein also in at least one of the operational modes an optical element may be configured (see further also below). For instance, the control region may be the smallest cuboid enclosing the optical element, but wherein the cuboid faces are not configured parallel to major faces of the optical element, more especially wherein the optical element is configured parallel to a diagonal plane within the cuboid.

Angles relative to a beam may be defined relative to an optical axis of the beam. Especially, the term "optical axis" may be defined as an imaginary line that defines the path along which light propagates through a system starting from the light generating element, here especially the light source. Especially, the optical axis may coincide with the direction of the light with the highest radiant flux.

As indicated above, a light generating device that is operating at higher power than the same (type of) light generating device operating at a lower power may degrade faster. Especially, this may be the case when the light generating device that is operating at higher power is operated at a power close to or at maximum power. Hence, the swapping of the beams may e.g. be used when after some operation time, one of the light generating devices has degraded.

Then, swapping may allow further operation. In general, the device providing substantial, if not all device light, to the luminescent element, may be operated at a higher power than the device providing light to the diffuser element. However, this is not necessarily the case. Hence, in specific embodiments the control system may be configured to control the first light generating arrangement, the second light generating arrangement, and the beam direction control system, such that in the first operational mode $Ip1/Id1>1$, and in the second operational mode $Ip2/Id2>1$. For instance, in embodiments $Ip1/Id1\geq1.5$ and $Ip2/Id2\geq1.5$. In specific embodiments, one or more of the following may apply (i) $1.5\leq Ip1/Id1\leq15$ and (ii) $1.5\leq Ip2/Id2\leq15$, such as one or more of (a) $1.5\leq Ip1/Id1\leq10$ and (b) $1.5\leq Ip2/Id2\leq10$.

However, in other embodiments, the control system may be configured to control the first light generating arrangement, the second light generating arrangement, and the beam direction control system, such that in the first operational mode $Ip1/Id1<1$, and in the second operational mode $Ip2/Id2<1$.

In embodiments, the control system may be configured to control the first operational mode and the second operational mode in dependence of one or more of a time-related signal, a sensor signal, and a user input.

The time-related signal may e.g. be provided by a timer, which indicates the operation time, and after a certain operation time, the operational mode may be switched. The time-related signal may also be provided by a counter, counting the pulses provided. Other options may also be possible. The sensor signal may e.g. be an optical sensor, sensing that the spectral power reduces with time, and after a certain drop, the mode may be switched. This may be a sensor dedicated to the spectral wavelength of the device light and/or may be sensor dedicated to the spectral wavelength of the luminescent material. Other options may also be possible. Hence, in specific embodiments the light generating system may further comprise a sensor, wherein the sensor may be configured to generate a sensor signal related to an absolute or relative contribution of the first device light and/or the second device light to the system light. Especially, this sensor may be an optical sensor. Further, in embodiments a user may be allowed to change the operational mode.

The change from a first operational mode to a second operational mode (or from the second operational mode to the first operational mode), may in embodiments be a single change during the lifetime of the system. However, it is herein not excluded that after some time the operational modes are switched again. In general, however, the frequency with which this happens may be relatively low, such as once per 500 hours or less frequent, like once per 1000 hours, or less frequent, like once per 2000 hours, or less frequent, or even once per 5000 hours, or less frequent.

Hence, in specific embodiments, the control system may be configured to change from one mode to another mode after a predetermined operation time. In more specific embodiments, the predetermined operation time may be selected from the range of 500-10,000 hours, like at least 1000 h, such as at least 2000 h. In other embodiments, the predetermined operation time may be selected from the range of at least 4000 hours.

The optical element may comprise a reflector, especially a specular reflector, having two essentially parallel faces which are both specular reflective. Alternatively, the optical element may comprise a reflective polarizer, wherein the reflective polarizer is transmissive for a first polarization (like p polarization or s polarization), and transmissive for a second polarization (like s polarization or p polarization). Especially, such reflective polarizer may have a relatively high transmission and relatively low scattering for the light that is transmitted, and may also be speculary reflective for light for which the reflective polarizer is reflective. Note that in embodiments the reflectivity for light with one polarization and transmissivity for light with another polarization may depend upon the arrangement of the reflective polarizer relative to the incoming beams of device light. Specific embodiments are further described below. In embodiments, the optical element may comprise a polarizing beam splitter.

Using a reflective polarizer, such as shortly described above, the propagation paths of the device light may be controlled by controlling one or more of (i) the position of the reflective polarized (such as within or outside the control region), (ii) an orientation of the reflective polarizer (such as a rotation (within the control region)), and (iii) the polarization of the device light. For instance, in embodiments in a first orientation the reflective polarizer may be reflective for p-polarized light, and transmissive for s-polarized light. In another orientation, especially after a rotation of 90° within a plane parallel to the major faces, the reflective polarizer may be transmissive for p-polarized light, and reflective for s-polarized light. Hence, assuming device light having p-polarization, in an operational mode, the reflective polarizer may be reflective for the p-polarized device light, and transmissive for the same light, would it be s-polarized. After rotation over 90°, the same reflective polarizer may be transmissive for p-polarized device light, and reflective form the same light, would it be s-polarized. Of course, this may also be selected the other way around, i.e. assuming device light having s-polarization, in an operational mode, the reflective polarizer may be reflective for the s-polarized device light, and transmissive for the same light, would it be p-polarized.

In specific embodiments, the first device light may comprise the first polarization (P1) and the second device light may comprise the first polarization (P1), and the beam direction control system may comprise a reflective polarizer, configured to reflect light having a first polarization (P1). Especially, in embodiments the beam direction control system may be configured to direct: (a) in the first operational mode of the beam direction control system (i) first device light, having the first polarization (P1), to the luminescent element, and (ii) second device light, having the first polarization (P1), to the diffuser element; and (b) in the second operational mode of the beam direction control system (i) second device light, having the first polarization (P1), to the luminescent element, and (ii) first device light, having the first polarization (P1), to the diffuser element. Hence, this provides a swap when changing from one of the modes to the other of the modes.

Hence, in embodiments during operation, the device light provided by the respective arrangements may both have the same polarization (especially p-polarized or s-polarized).

For instance, the first device light may have p-polarization and the second device light may have p-polarization, and both the first device light and the second device light may be reflected via the beam direction control system (in a first operational mode), especially in these embodiments via the reflective polarizer (or another optical element). However, a change of the reflective polarizer (or other optical element) may allow transmission of such p polarized light (in a second operational mode). Alternatively, the p-polarization (during a first operational mode) of the (first and/or second) device light may be changed into s-polarization (during a second operational mode). Yet, alternatively, when the optical element, such as the reflective polarizer reflects p-polarized light (in a first operational mode), and the first device light and the second device light propagate such, that in the control region the beams have a mutual angle of 90°, and both are reflected at the optical element, removal (in a second operational mode) of the optical elements, such as the reflective polarizer, out of the control region will lead to transmission through the control region of the beams.

Hence, in embodiments the beam direction control system may be configured to control the first operational mode and the second operational mode by rotating the reflective polarizer. Especially, the rotation may be over 90°. Hence, the reflective polarizer may be rotated 90° in the second operational mode relative to a first operational mode. The beam direction control system may in embodiments comprise an actuator configured to control a rotational position of the reflective polarizer.

Further, in (other) embodiments, the beam direction control system may be configured to control the first operational mode and the second operational mode by controlling a polarization of the first device light and a polarization of the second device light. To this end, the first light generating arrangement and the second light generating arrangement may comprise a controllable optical element, such as a controllable $\lambda/2$ retarder (see also above about controlling the polarization of the device light of the first light generating arrangement and/or of the second light generating arrangement), such that in a first operational mode the device light has a p-polarization or an s-polarization, and in a second operational mode the device light has an s-polarization or a p-polarization.

As indicated above, a rotatable reflective polarizer may be applied. However, in embodiments (also) a translatable reflective polarizer may be applied. As indicated above, when the reflective polarizer reflects p-polarized light (in a first operational mode), and the first device light and the second device light propagate such, that in the control region the beams have a mutual angle of 90°, removal (in a second operational mode) of the reflective polarizer will lead to transmission through the control region of the beams. Therefore, in specific embodiments the beam direction control system may be configured to control the first operational mode and the second operational mode by configuring the reflective polarizer into or outside the control region.

Hence, a removal of the reflective polarizer may also be possible in a second operational mode. Therefore, in fact the same principle may apply when instead of a reflective polarizer, a specular reflective mirror is applied.

Hence, in specific embodiments, wherein the beam direction control system comprises a specular reflective element, the beam direction control system may be configured to direct: (a) in the first operational mode of the beam direction control system especially via transmission through the control region, such as via transmission through the optical element (more especially through a reflective polarizer), or in the absence of such optical element (such as a reflective polarizer or specular reflective element), (i) first device light, in embodiments having the first pump intensity (Ip1), to the luminescent element, and (ii) second device light, in embodiments having the first diffuser part intensity (Id1), to the diffuser element; and (b) in the second operational mode of the beam direction control system, via reflection within the control region, especially at the optical element (more especially at the reflective polarizer or at the specular reflective element), (i) second device light, in embodiments having the second pump intensity (Ip2), to the luminescent element, and (ii) first device light, in embodiments having the second diffuser part intensity (Id2), to the diffuser element.

Especially, in embodiments the beam direction control system may be configured to control the first operational mode and the second operational mode by configuring a specularly reflective element (or reflective polarizer) into or outside the control region; wherein, when configured inside the control region, the reflector and the first beam (B1) of first device light may have a first mutual angle ($\beta 1$), and the reflector and the second beam (B2) of second device light may have a second mutual angle ($\beta 2$), wherein, in specific embodiments, $\beta 1=\beta 2=45°$.

Note that in the operational mode wherein the optical element is configured in the control region, the first device light and the second device light may be reflected at the optical element, whereas when the optical element is removed from the control region, the device light of the first light generating arrangement and the second light generating arrangement may propagate (under a mutual angle of 90° in the control region), essentially without any deflection in the control region, to the luminescent element or diffuser element.

Therefore, in embodiments the beam direction control system may comprise an actuator, wherein the beam direction control system may be configured to select with the actuator a position of an optical element within or outside the control region, wherein the control system may be configured to control the position of the optical element in dependence of the operational mode; and wherein the optical element may comprise the reflective polarizer or a specularly reflective element. Hence, in embodiments the actuator may be configured to control a translational position of the reflective polarizer.

In embodiments, the beam direction control system comprises a reflective polarizer, a specularly reflective element or a combination of two polarization rotators, for switching of the beam direction.

In embodiments, a reflective polarizer may be used and rotated such that in a first mode first device light having a first polarization is (fully) reflected by the reflective polarizer and second device light having a second polarization is also (fully) reflected by the reflective polarizer, and in a second mode the first device light having the first polarization is (fully) transmitted by the reflective polarizer and the second device light having the second polarization is also (fully) transmitted by the reflective polarizer.

In embodiments, a specularly reflective element may be used and inserted and removed from the optical path of the laser beams such that in a first mode first device light (having a first polarization) is (fully) reflected by the specularly reflective element and second device light (having a second polarization) is also (fully) reflected by the specularly reflective element, and in a second mode the first device light (having the first polarization) is (fully) transmitted by the specularly reflective element and the second device light (having the second polarization) is also (fully) transmitted by the specularly reflective element.

In embodiments, a combination of two polarization rotators may be used and inserted and removed with respect to a reflective polarizer such that in a first mode first device light (having a first polarization) is (fully) reflected by the reflective polarizer and second device light (having a second polarization) is also (fully) reflected by the reflective polarizer, and in a second mode the first device light (having the first polarization) is (fully) transmitted by the reflective polarizer and the second device light (having the second polarization) is also (fully) transmitted by the reflective polarizer. The reason is that the polarization of the first and second device light is being rotated by the polarization rotators.

The luminescent element and the reflective element may be operated in the reflective mode or the transmissive mode. Though it is not necessary that both are operated in the same mode, especially in embodiments the luminescent element and the reflective element may be operated in the reflective mode or the luminescent element and the reflective element may be operated in the transmissive mode.

A transmissive mode may allow a simpler system. Further, in the transmissive mode, a substantial full conversion of the device light into luminescent material light by the luminescent material may be easier than in the reflective mode. Hence, in embodiments the transmissive mode is selected for at least the luminescent element, wherein transmission of device light by the luminescent element is at maximum 5%, such as at maximum 2%, like at maximum 1% transmission of the device light. Note however that in other embodiments, a partial conversion by the luminescent element may be selected. In the reflective mode, thermal management may be easier, as a substantial part of the luminescent material may be in thermal contact with a thermally conductive element, like a heatsink or heat spreader. Further, in the reflective mode it may be desirable to us a dichroic mirror for combining different beams of light, such as described in U.S. Pat. No. 7,070,300, which is incorporated herein by reference. Therefore, in embodiments the light generating system may be operated in the transmissive mode or the reflective mode.

By controlling the power to the first light generating device and the power to the second light generating device, a spectral power distribution of the system light may be selected. As indicated above, in embodiments the system light may be white light. In embodiments, it may be desirable to maintain the system light at a certain correlated color temperature. For instance, even though one of the light generating devices may show a time dependent behavior, the control system may control the first light generating device and the second light generating device such that a substantially constant CCT is obtained. Therefore, in embodiments the control system may be configured to maintain a correlated color temperature of the system light within ±300 K from a predetermined correlated color temperature. Alternatively or additionally, in embodiments the control system may be configured to maintain a correlated color temperature of the system light within +15 standard deviation of color matching, more especially within ±10 SDCM from a predetermined correlated color temperature. Especially, in embodiments the control system may be configured to control a spectral power distribution of the system light.

In specific embodiments, the first light generating arrangement is configured to provide blue device light and the second light generating arrangement is configured to provide blue device light. Hence, in embodiments blue laser light may be applied. Further, in embodiments the luminescent material may be configured to convert at least part of the blue light into light having spectral intensity in one or more of the green wavelength range, the yellow wavelength range, the orange wavelength range, and the red wavelength range. Especially, the luminescent material light may have one or more wavelength in the yellow wavelength range. Further, in specific embodiments the luminescent material may comprise a garnet based luminescent material (see also above).

The terms "violet light" or "violet emission", and similar terms, may especially relate to light having a wavelength in the range of about 380-440 nm. In specific embodiments, the violet light may have a centroid wavelength in the 380-440 nm range. The terms "blue light" or "blue emission", and similar terms, may especially relate to light having a wavelength in the range of about 440-490 nm (including some violet and cyan hues). In specific embodiments, the blue light may have a centroid wavelength in the 440-490 nm range. The terms "green light" or "green emission", and similar terms, may especially relate to light having a wavelength in the range of about 490-560 nm. In specific embodiments, the green light may have a centroid wavelength in the 490-560 nm range. The terms "yellow light" or "yellow emission", and similar terms, may especially relate to light having a wavelength in the range of about 560-590 nm. In specific embodiments, the yellow light may have a centroid wavelength in the 560-590 nm range. The terms "orange light" or "orange emission", and similar terms, may especially relate to light having a wavelength in the range of about 590-620 nm. In specific embodiments, the orange light may have a centroid wavelength in the 590-620 nm range. The terms "red light" or "red emission", and similar terms, may especially relate to light having a wavelength in the range of about 620-750 nm. In specific embodiments, the red light may have a centroid wavelength in the 620-750 nm range. The terms "cyan light" or "cyan emission", and similar terms, especially relate to light having a wavelength in the range of about 490-520 nm. In specific embodiments, the cyan light may have a centroid wavelength in the 490-520 nm range. The terms "amber light" or "amber emission", and similar terms, may especially relate to light having a wavelength in the range of about 585-605 nm, such as about 590-600 nm. In specific embodiments, the amber light may have a centroid wavelength in the 585-605 nm range. The phrase "light having one or more wavelengths in a wavelength range" and similar phrases may especially indicate that the indicated light (or radiation) has a spectral power distribution with at least intensity or intensities at these one or more wavelengths in the indicate wavelength range. For instance, a blue emitting solid state light source will have a spectral power distribution with intensities at one or more wavelengths in the 440-495 nm wavelength range.

The term "centroid wavelength", also indicated as Δc, is known in the art, and refers to the wavelength value where half of the light energy is at shorter and half the energy is at longer wavelengths; the value is stated in nanometers (nm). It is the wavelength that divides the integral of a spectral power distribution into two equal parts as expressed by the formula $\lambda c=\varepsilon\lambda*I(\lambda)/(\Sigma I(\lambda))$, where the summation is over the wavelength range of interest, and $I(\lambda)$ is the spectral energy density (i.e. the integration of the product of the wavelength and the intensity over the emission band normalized to the integrated intensity).

The centroid wavelength may e.g. be determined at operation conditions.

The luminescent material may comprise a single luminescent material, but may in other embodiments also comprise two or more luminescent material.

The device light, together with the luminescent material light, may in embodiments provide white system light. White system light may emanate from the system.

Luminescent material light and/or diffused device light may escape from the system via one or more further optical elements. Such further optical elements may be configured downstream of the luminescent element and the diffuser element.

The term "optics" may especially refer to (one or more) optical elements. Hence, the terms "optics" and "optical elements" may refer to the same items. The optics may include one or more or mirrors, reflectors, collimators, lenses, prisms, diffusers, phase plates, polarizers, diffractive elements, gratings, dichroics, arrays of one or more of the afore-mentioned, etc. Alternatively or additionally, the term "optics" may refer to a holographic element or a mixing rod. In embodiments, the optics may include one or more of beam expander optics and zoom lens optics. See further above for examples of optics. In embodiments, the optics may comprise an integrator, like a "Koehler integrator" (or "Köhler integrator").

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In yet a further aspect, the invention also provides a lamp or a luminaire comprising the light generating system as defined herein. The luminaire may further comprise a housing, optical elements, louvres, etc. etc. The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a light generating device selected from the group of a lamp, a luminaire, a projector device, a disinfection device, a photochemical reactor, and an optical wireless communication device, comprising the light generating system as defined herein. The light generating device may comprise a housing or a carrier, configured to house or support, one or more elements of the light generating system. For instance, in embodiments the light generating device may comprise a housing or a carrier, configured to house or support one or more of the first light generating arrangement, the second light generating arrangement, the luminescent element, the diffuser element, and the beam direction control system. The lighting device may also be a stage lamp. Therefore, in an aspect the invention provides a lighting device selected from the group of a lamp, a luminaire a projector device, and a stage lamp, comprising the light generating system according to any one of the preceding claims. Especially, in embodiments the lighting device may be configured to generate system light having a correlated color temperature selected from the range of 6000-10,000 K.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to visible light.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
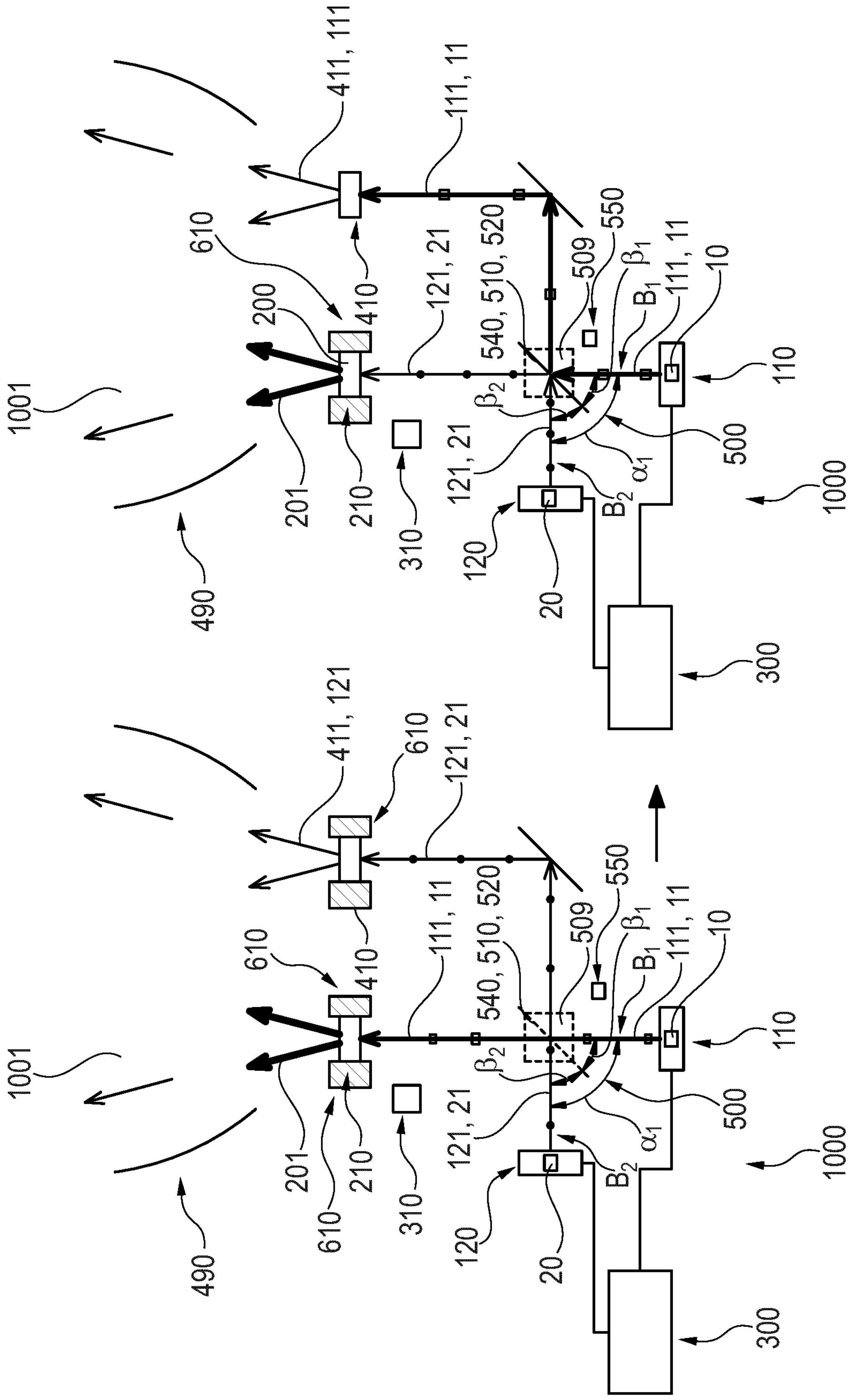
FIG. 1 schematically depicts two operational modes, here especially using a reflective polarizer, and applying the transmissive mode.

FIG. 1 schematically depicts schematically depicts two operational modes, here especially using a reflective polarizer, and applying the transmissive model. This drawing is here below also used to explain other embodiments (such as not using a reflective polarizer or using the reflective polarizer in another way than depicted).

FIG. 1 schematically depicts an embodiment of a light generating system 1000 comprising a first light generating arrangement 110, a second light generating arrangement 120, a luminescent element 210, a diffuser element 410, a beam direction control system 500, and a control system 300.

The first light generating arrangement 110 may be configured to generate a first beam (B1) of first device light 111. Especially, the first light generating arrangement 110 may comprise a first solid state laser light source 10. The second light generating arrangement 120 may be configured to generate a beam (B2) of second device light 121. Especially, the second light generating arrangement 120 may comprise a second solid state laser light source 20.

The luminescent element 210 may comprise a luminescent material 200. Especially, the luminescent material 200 may be able to convert the first device light 111 and/or the second device light 121 received by the luminescent material 200 into luminescent material light 201. As indicated above, dependent upon the embodiments and dependent upon the operational mode, the luminescent element 210 may receive at least part of the first device light 111 and/or at least part of the second device light 121 (see further also below).

The diffuser element 410 may be configured to diffuse first device light 111 and/or the second device light 121 received by the diffuser element 410, thereby providing diffused light 411. As indicated above, dependent upon the embodiments and dependent upon the operational mode, the diffuser element 410 may receive at least part of the first device light 111 and/or at least part of the second device light 121 (see further also below).

Especially, the beam direction control system 500 may be configured in a light receiving relationship with the first light generating arrangement 110 and the second light generating arrangement 120. In embodiments, the beam direction control system 500 may be configured to direct: (a) in a first operational mode of the beam direction control system 500 (i) a first pump part of the first device light 111 and/or the second device light 121, having a first pump intensity (Ip1), to the luminescent element 210, and (ii) a first diffuser part of the first device light 111 and/or the second device light 121, having a first diffuser part intensity (Id1), to the diffuser element 410, and (b) in a second operational mode of the beam direction control system 500 (i) a second pump part of the first device light 111 and/or the second device light 121, having a second pump intensity (Ip2), to the luminescent element 210, and (ii) a second diffuser part of the first device light 111 and/or the second device light 121, having a second diffuser part intensity (Id2), to the diffuser element 410.

On the left of FIG. 1, an operational mode may be depicted and on the right of FIG. 1, another operational mode may be depicted.

In embodiments, the first pump intensity (Ip1) and the second pump intensity (Ip2) may have different relative contributions of the first device light 111 and/or the second device light 121. Alternatively or additionally, the first diffuser part intensity (Id1) and the second diffuser part intensity (Id2) may have different relative contributions of the first device light 111 and/or the second device light 121.

Especially, the control system 300 may be configured to control the first light generating arrangement 110, the second light generating arrangement 120, and the beam direction control system 500.

In specific embodiments, the control system 300 may be configured to control the first operational mode and the second operational mode in dependence of one or more of a time-related signal, a sensor signal, and a user input.

Further, in embodiments the light generating system 1000 may be configured to generate (white) system light 1001 comprising the luminescent material light 201 and the diffused light 411. Especially, the system light 1001 may comprise visible light, more especially may essentially consist of visible light. More especially, the system light 1001 may be white system light 1001.

In embodiments, the control system 300 may be configured to control the first light generating arrangement 110, the second light generating arrangement 120, and the beam direction control system 500, such that in the first operational mode $Ip1/Id1>1$, and in the second operational mode $Ip2/Id2>1$. However, other embodiments may also be possible (see also above).

In specific embodiments, the beam direction control system 500 may be configured to direct: (a) in the first operational mode of the beam direction control system 500 (i) first device light 111, having the first pump intensity (Ip1), to the luminescent element 210, and (ii) second device light 121, having the first diffuser part intensity (Id1), to the diffuser element 410; and (b) in the second operational mode of the beam direction control system 500 (i) second device light 121, having the second pump intensity (Ip2), to the luminescent element 210, and (ii) first device light 111, having the second diffuser part intensity (Id2), to the diffuser element 410.

In specific embodiments, one or more of the following may apply: $Ip1/Id1\geq 1.5$ and $Ip2/Id2>1.5$.

As schematically depicted, in embodiments the beam direction control system 500 may comprise a control region 509. Especially, during operation of the light generating system 100 first device light 111 and second device light 121 propagate through the control region 509 under a first mutual angle $\alpha 1$. Especially, $\alpha 1=90°$.

In specific embodiments, the first device light 111 may comprise the first polarization (P1) and the second device light 121 may (also) comprise the first polarization (P1). Hence, in embodiments the first device light 111 and the second device light 121 have the same polarization.

In embodiments, the beam direction control system 500 may comprise a reflective polarizer 510, configured to reflect light having a first polarization (P1) (see FIG. 1 on the right). Here, both the first device light 111 and the second device light 121 are reflected at the reflective polarizer 510. In specific embodiments, further also elucidated below, instead of the reflective polarizer 510, a specular reflective mirror 520 may be applied (see further below). In the embodiments (effectively) depicted in FIG. 1, either the reflective polarizer 510 or the specular reflective mirror 520 is applied.

In specific embodiments, the beam direction control system 500 may be configured to direct: (a) in the first operational mode of the beam direction control system 500 (i) first device light 111, having the first polarization (P1), to the luminescent element 210, and (ii) second device light 121, having the first polarization (P1), to the diffuser element 410, and (b) in the second operational mode of the beam direction control system 500 (i) second device light 121, having the first polarization (P1), to the luminescent element 210, and (ii) first device light 111, having the first polarization (P1), to the diffuser element 410.

Assuming in embodiments a reflective polarizer 510, in specific embodiments, the beam direction control system 500 may be configured to control the first operational mode and the second operational mode by rotating the reflective polarizer 510. Referring to FIG. 1, on the right the reflective polarizer 510, configured to reflect light having a first polarization (P1), reflects the light having the first polarization (P1). However, when rotating the reflective polarizer 90°, the reflective polarizer 510 may effectively become substantially transmissive for the light having the first polarization (and reflective for light having a second polarization).

Assuming device light 111,121 having p-polarization, in an operational mode (see on the right), the reflective polarizer may be reflective for the p-polarized device light 111,121, and transmissive for the same light, would it be s-polarized. After rotation over 90°, the same reflective polarizer may be transmissive for p-polarized device light 111,121, and reflective form the same light, would it be s-polarized. Of course, this may also be selected the other way around, i.e. assuming device light 111,121 having s-polarization, in an operational mode, the reflective polarizer may be reflective for the s-polarized device light 111, 121, and transmissive for the same light, would it be p-polarized.

The dashed line in FIG. 1 on the left, also indicated with references 540, 510, and 520 may refer to a 90° rotated reflective polarizer 510, or to a removed specular reflective mirror 520.

As can be derived from the above the switch from reflective to non-reflective for a specific polarization by rotating the reflective polarizer 510 may in an alternative way be done by keeping the reflective polarizer 510 unrotated at its position (at least partly in the control region 509), but changing the polarization from the device light 111,121 from the first polarization (P1) to a second polarization (P2), e.g. from p-polarization to s-polarization, or vice versa (see also below at FIG. 3). Hence, in embodiments the beam direction control system 500 may be configured to control the first operational mode and the second operational mode by controlling a polarization of the first device light 111 and a polarization of the second device light 121. To this end, e.g. λ/2 retarders may be applied (see for instance also below).

As can also be derived from the above, the switch from reflective to non-reflective for a specific polarization by rotating the reflective polarizer 510 may in an alternative way be done by using the reflective configuration, wherein the device light 111,121 having the first polarization is reflected at the reflective polarizer in a first operational mode, and removing the reflective polarizer 510 from the control region 509, thereby effectively offering a transmissive mode. The same principle may apply to a specularly reflective element 520.

Therefore, in specific embodiments the beam direction control system 500 may comprise an actuator 550. Especially, in embodiments the beam direction control system 500 may be configured to select with the actuator a position of an optical element 540 within or outside the control region 509. Especially, the control system 300 may be configured to control the position of the optical element 540 in dependence of the operational mode. In specific embodiments, the optical element 540 may (thus) in embodiments comprise the reflective polarizer 510 or a specularly reflective element 520. Referring to FIG. 1, on the left the first operational mode, with e.g. the optical element 540 configured external from the control region 509 may be depicted, and on the right, the second operational mode, with the optical element 540 configured within the control region 509 may be depicted. The external configuration of the optical element 540 is indicated with the dashed line (to which reference 540 refers).

Referring to FIG. 1, the optical element 540 may comprise two parallel major faces. First device light 111 may be reflected at one of these faces, and second device light 121 may be reflected at the other one of these faces.

The beam direction control system 500 may be configured to control the first operational mode and the second operational mode by configuring the reflective polarizer 510 into or outside the control region 509. In FIG. 1, the reflective polarizer 510 may thus be configured in the control region 509 in the right configuration of FIG. 1, and not configured in the control region 509 in the left configuration of FIG. 1 (see the dashed line on the left).

Likewise, this may apply to the use of a specular reflective element. A different embodiment of FIG. 1, wherein instead of the reflective polarizer 510 a specular reflective element 520 is applied, the specular reflective element 520 may thus be configured in the control region 509 in the right configuration of FIG. 1, and not configured in the control region 509 in the left configuration of FIG. 1 (see the dashed line). Hence, in embodiments the beam direction control system 500 may be configured to control the first operational mode and the second operational mode by configuring a specularly reflective element 520 into or outside the control region 509.

As shown in FIG. 1, when configured inside the control region 509, the reflector 509 and the first beam (B1) of first device light 111 have a first mutual angle $\beta 1$, and the reflector 509 and the second beam (B2) of second device light 121 have a second mutual angle $\beta 2$. Especially, $\beta 1 - \beta 2 = 45°$.

In embodiments, the control system 300 may be configured to maintain a correlated color temperature of the system light 1001 within ±300K and/or ±10 standard deviation of color matching from a predetermined correlated color temperature.

In specific embodiments, the control system 300 may be configured to change from one mode to another mode after a predetermined operation time. The predetermined operation time may in embodiments be selected from the range of 500-10,000 h, such as from the range of at least 2000 h. However, other values may also be possible.

In specific embodiments, the light generating system 1000 may further comprise a sensor 310. Especially, the sensor 310 may be configured to generate a sensor signal related to an absolute or relative contribution of the first device light 111 and/or the second device light 121 to the system light 1001. The control system 300 may on the basis thereon switch from one mode to another mode.

Further, in specific embodiments the control system 300 may be configured to control a spectral power distribution of the system light 1001. In embodiments, the system light 1001 may have a correlated color temperature selected from the range of 6000-10,000 K.

In FIG. 1, reference 490 refers to a beam shaping element. The beam shaping element 490 may comprise one or more lenses and/or one or more collimators. Hence, further optics may be available, to e.g. beamshape the system light 1001 that escapes from the system 1000.

Reference 610 refers to a heatsink, or other thermally conductive element. Here, the thermally conductive element 610 may enclose the luminescent element 210 and/or the diffuser element 410.

Figure 2:
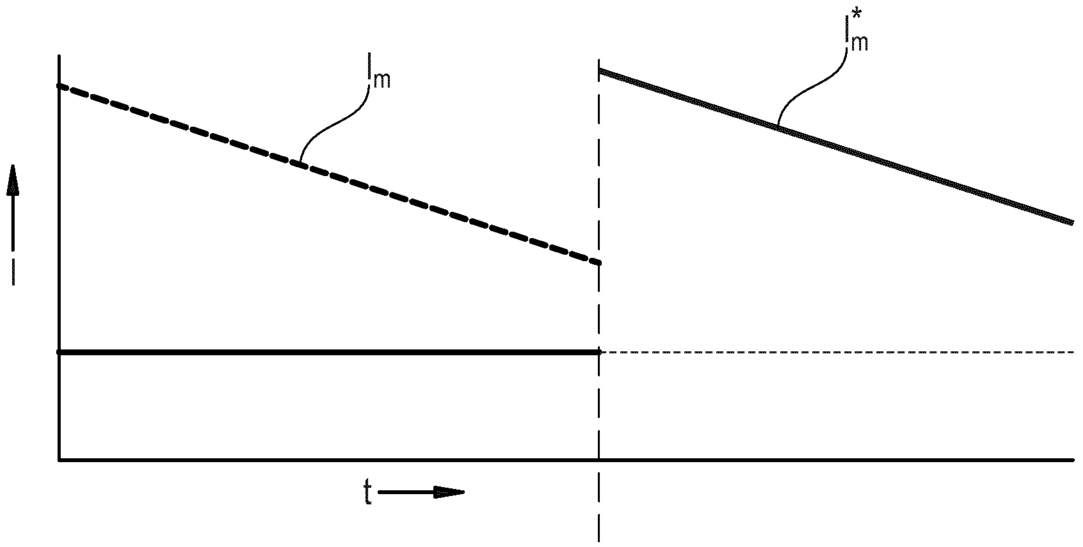
FIG. 2 schematically depicts some aspects.

FIG. 2 schematically depicts an intensity of the device light 1001 when operated at maximum capacity Im, and at lower power. After some time, the devices can be switched, and another device could be operated at maximum capacity I*m. Of course, operation at maximum capacity is not necessary, but an option. The devices can be operated in such a way, that the spectral power distribution of the system light 1001 stays essentially constant.

In embodiments, the light generating system 1000 may be operated in the transmissive mode or the reflective mode. In FIG. 1, the system 1000 is operated in the transmissive mode, especially the luminescent element 210 and the diffuser element 410 are operated in the transmissive mode. However, the luminescent element 210 and the diffuser element 410 may also be operated in the reflective mode, see FIG. 3.

For the reflective mode, a dichroic mirror may be arranged between a reflective diffuser element 410 and the luminescent element 210, such as also described in U.S. Pat. No. 7,070,300, incorporated herein by reference. Further, an optical unit may be arranged between the reflective polarizer and the diffuser to diffuse and rotate the polarization of the (blue) device light.

Figure 3A:
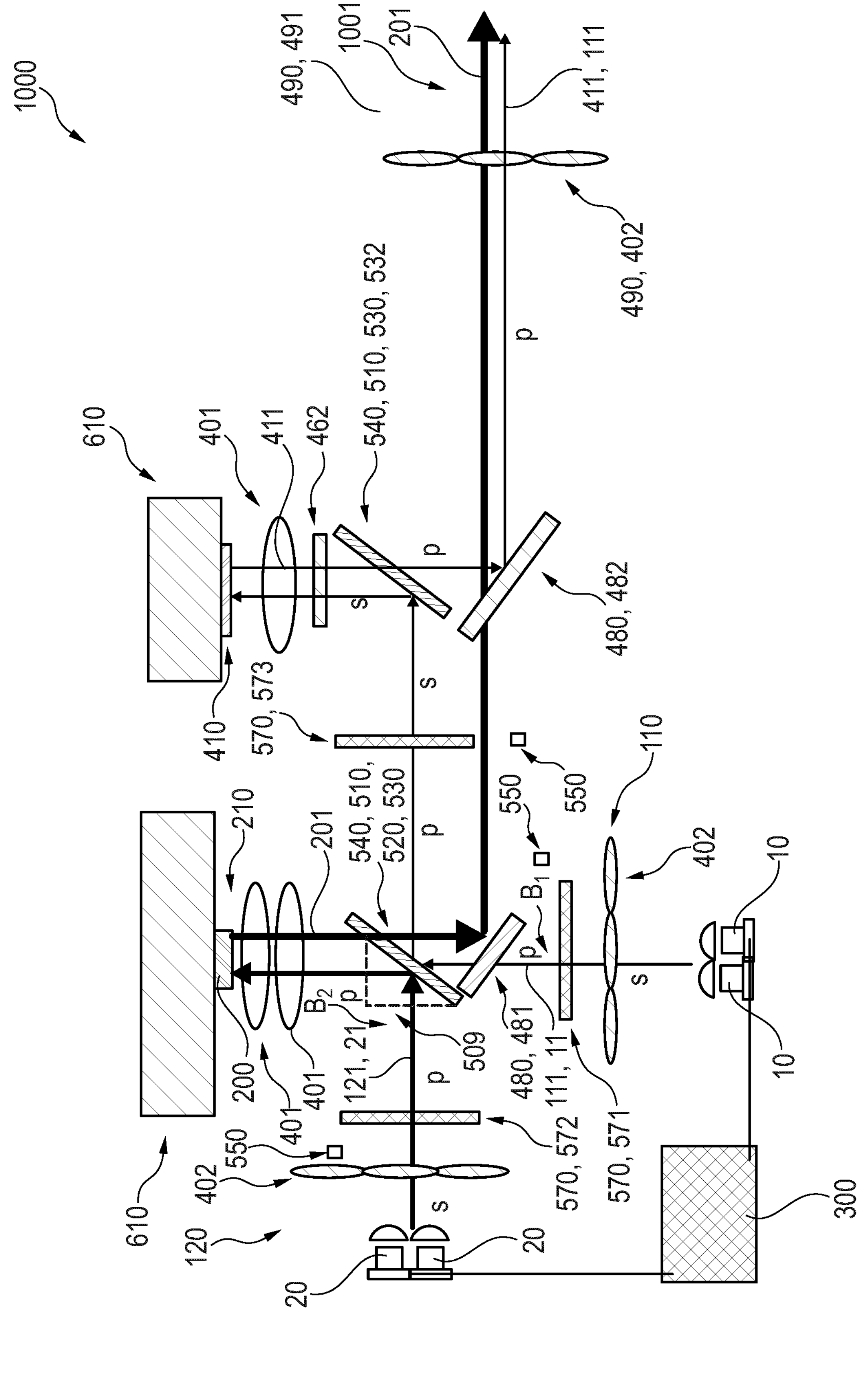
FIGS. 3*a*-3*b* schematically depict two operational mode, here also especially using a polarizing beam splitter, and applying the reflective mode.
Figure 3B:
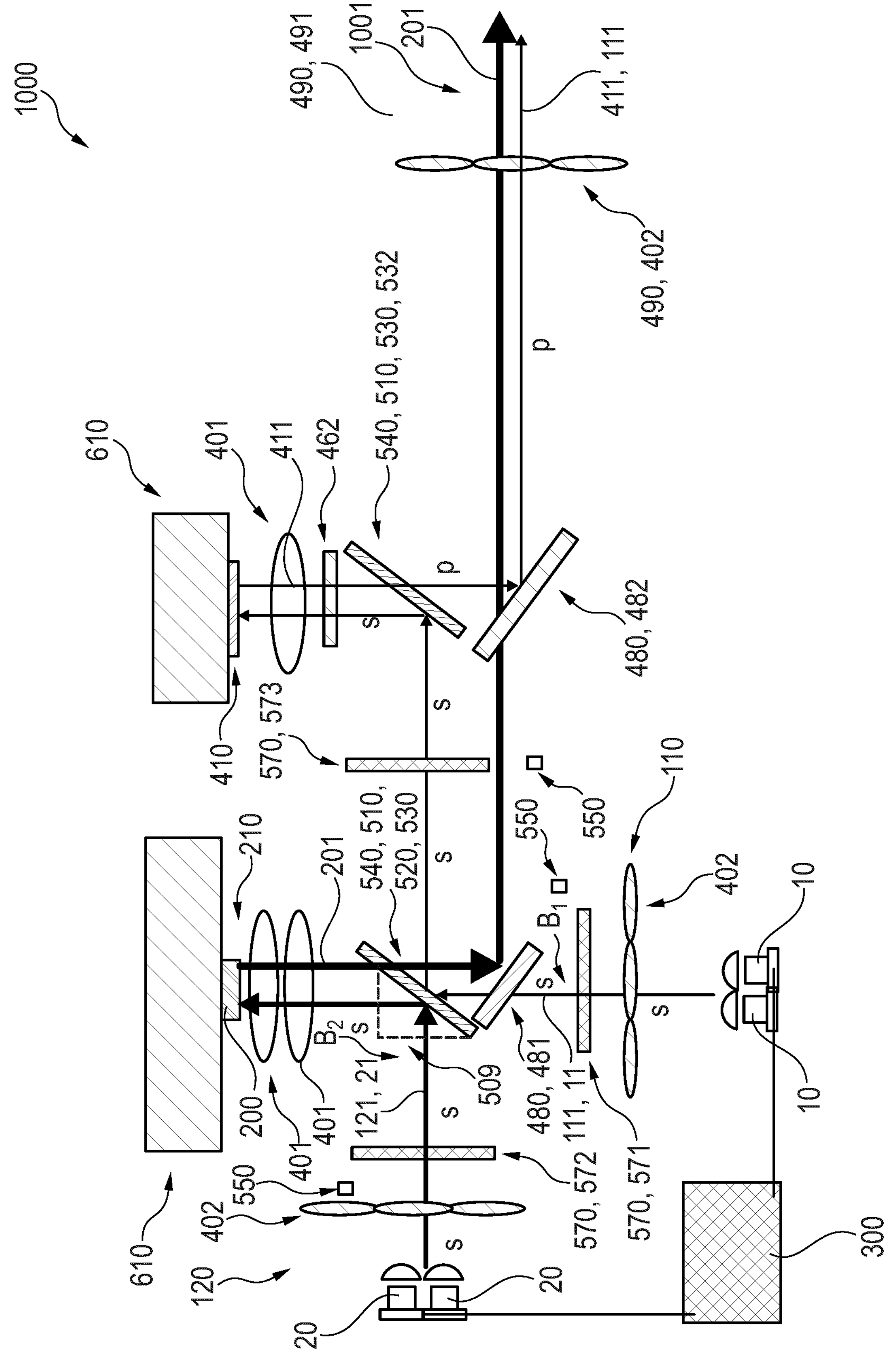

FIGS. 3*a*-3*b* schematically depict two modes of another embodiment. The embodiment of FIG. 3 overlaps substantially with the embodiment of FIG. 1. Additional elements in FIG. 3 which may also be applied in FIG. 1, and similar embodiments, are e.g. laser banks, optics (directly downstream of the light sources 10,20), beam homogenizers 402 (downstream of the respective light sources 10,20, and indicated with references 571 and 572), another beam homogenizer 402 (as embodiment of the beam shaping element 490), polarizers 570 (respectively indicated with references 571 and 572 (downstream of the first light source 10 and downstream of the second light source 20, respectively), and optics 401.

The polarizers 570 may especially be λ/2 retarders. In embodiments, they may be controllable. One or more actuators 550 may be used to control such retarders. Further, the optical element 540 which is used to direct first device light 111 and/or second device light 121 in an operational mode to the luminescent element 210 may especially be a polarizing beam splitter 530, indicated with reference 531, which may especially be reflective for device light 111,121, but transmissive for at least part of the luminescent material light 201. A similar type of polarizing beam splitter 530 may be configured to direct first device light 111 and/or second device light 121 to the diffuser element 410, and is indicated with reference 532. The diffuser element 410 here is a reflective diffuser. A further additional polarizer 570 is the λ/2 retarder 573, configured between the two polarizing beam splitters 531,532.

Referring to FIG. 3, the polarizing beam splitter 530 (which is used to direct first device light 111 and/or second device light 121 in an operational mode to the luminescent element 210, i.e. polarizing beam splitter 531) may comprise two parallel major faces. First device light 111 may be reflected at one of these faces, and second device light 121 may be reflected at the other one of these faces.

Reference 480 refers to dichroic reflectors, with reference 481 indicating a first dichroic reflector, which may especially be transmissive for first device light 111 but reflective for at least part of the luminescent material light 201, and with reference 482 indicating a second dichroic reflector, which may especially be transmissive for at least part of the luminescent material light 201 and reflective for the second device light 121 (and also reflective for the first device light 111), and thus also reflective for diffused light 411.

Reference 462 refers to a λ/4 retarder. The combination of the λ/4 retarder 462 and the polarizing beam splitter 532 is desirable for efficiency reasons.

As described above, several options are possible to control the propagation of the first device light 111 and the second device light 121. In embodiments, all λ2 retarders 571,572,573 may be rotated, especially over 90°, changing the polarizations of the device light 111,121.

Figure 4:
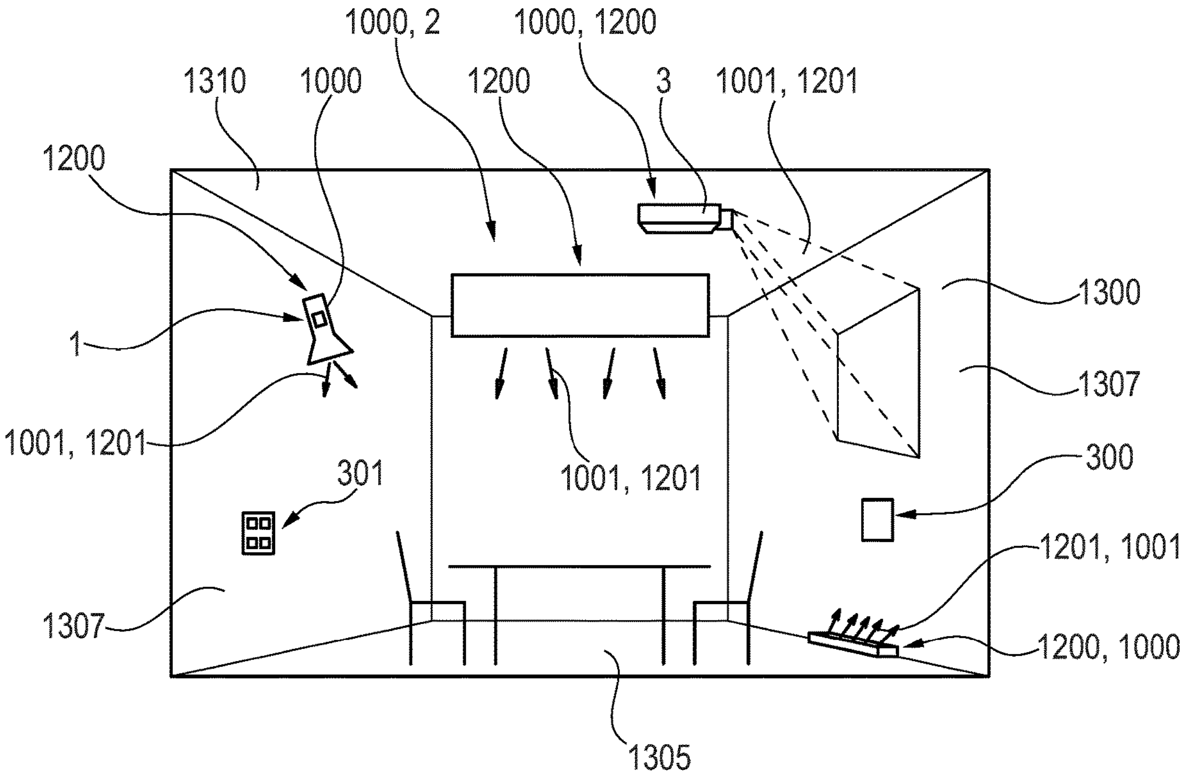
FIG. 4 schematically depict some applications.

FIG. 4 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 4 also schematically depicts an embodiment of lamp 1 comprising the light generating system 1000. Reference 3 indicates a projector device or projector system, which may be used to project images, such as at a wall, which may also comprise the light generating system 1000. Hence, FIG. 4 schematically depicts embodiments of a lighting device 1200 selected from the group of a lamp 1, a luminaire 2, a projector device 3, a disinfection device, a photochemical reactor, and an optical wireless communication device, comprising the light generating system 1000 as described herein. In embodiments, such lighting device may be a lamp 1, a luminaire 2, a projector device 3, a disinfection device, or an optical wireless communication device. Lighting device light escaping from the lighting device 1200 is indicated with reference 1201. Lighting device light 1201 may essentially consist of system light 1001, and may in specific embodiments thus be system light 1001. Reference 1300 refers to a space, such as a room. Reference 1305 refers to a floor and reference 1310 to a ceiling; reference 1307 refers to a wall.

The lighting device 1200 may also comprise a stage lamp. Hence, in embodiments the lighting device 1200 may be selected from the group of a lamp 1, a luminaire 2 a projector device 3, and a stage lamp, comprising the light generating system 1000. In specific embodiments, the lighting device 1200 may be configured to generate system light 1001 (having a correlated color temperature selected from the range of 6000-10,000 K).

Figures 5A, 5B, 5C:
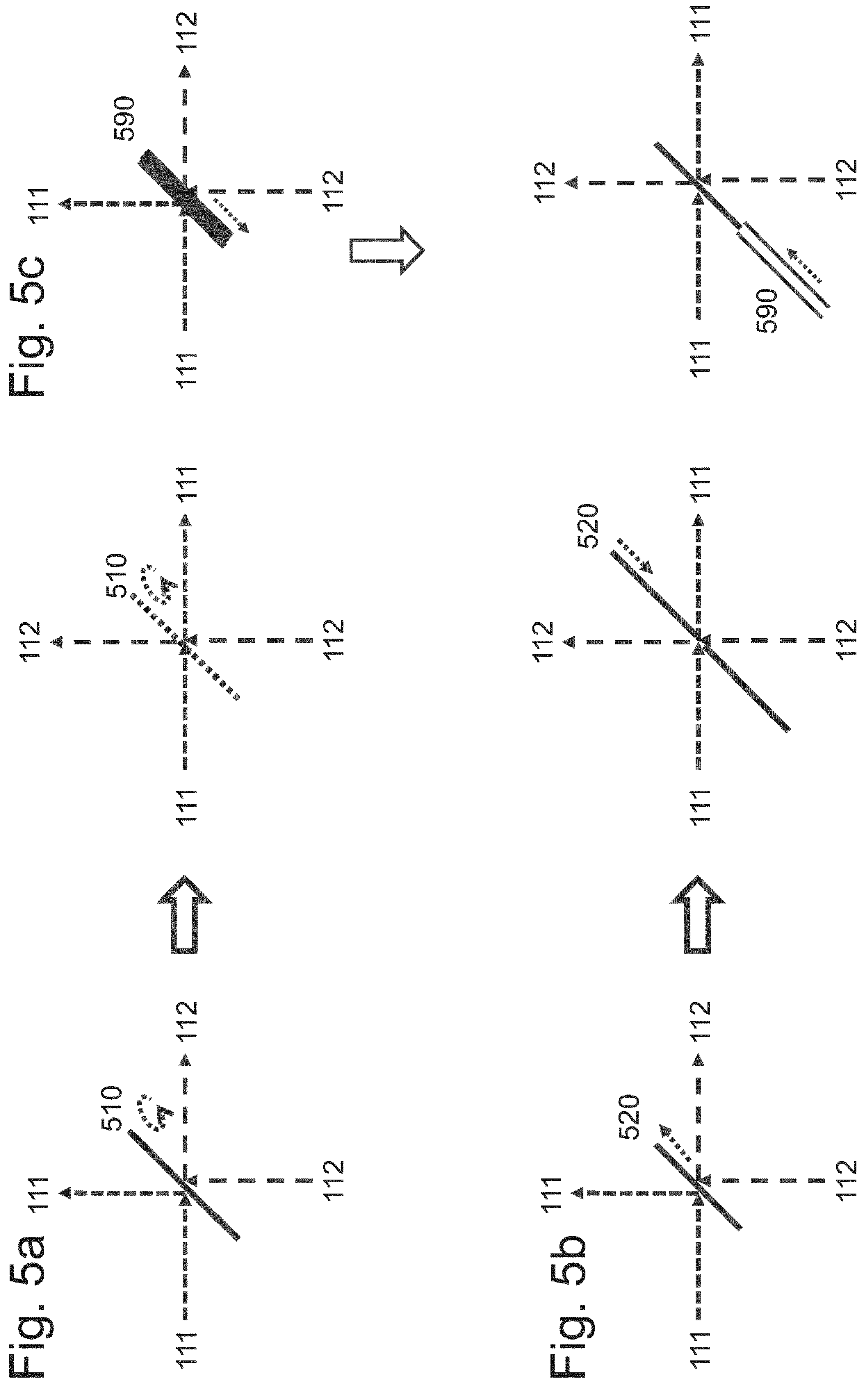
FIGS. 5*a*-5*c* schematically depict switching of the beam direction control system using a reflective polarizer, a specularly reflective element and two polarization rotators.

FIGS. 5*a*-5*c* schematically depict embodiments of the beam direction control system using a reflective polarizer 510 (FIG. 5*a*), a specularly reflective element 520 (FIG. 5*b*) and two polarization rotators 590 (FIG. 5*c*), and switching of the beam direction thereof.

As depicted in FIG. 5*a*, a reflective polarizer 510 is rotated such that in a first mode first device light 111 having a first polarization P1 is (fully) reflected by the reflective polarizer 510 and second device light 112 having a second polarization P2 is also (fully) reflected by the reflective polarizer 510, and in a second mode the first device light 111 having the first polarization P1 is (fully) transmitted by the reflective polarizer 510 and the second device light 112 having the second polarization P2 is also (fully) transmitted by the reflective polarizer 510.

As depicted in FIG. 5*b*, a specularly reflective element 520 is inserted and removed from the optical path of the laser beams such that in a first mode first device light 111 (having a first polarization P1) is (fully) reflected by the specularly reflective element 520 and second device light 112 (having a second polarization P2) is also (fully) reflected by the specularly reflective element 520, and in a second mode the first device light 111 (having the first polarization P1) is (fully) transmitted by the specularly reflective element 520 and the second device light 112 (having the second polarization P2) is also (fully) transmitted by the specularly reflective element 520.

As depicted in FIG. 5*c*, a combination of two polarization rotators 590 is inserted and removed with respect to a reflective polarizer 510 such that in a first mode first device light 111 (having a first polarization P1) is (fully) reflected by the reflective polarizer 510 and second device light 112 (having a second polarization P2) is also (fully) reflected by the reflective polarizer 510, and in a second mode the first device light 111 (having the first polarization P1) is (fully) transmitted by the reflective polarizer 510 and the second device light 112 (having the second polarization P2) is also (fully) transmitted by the reflective polarizer 510. The reason is that the polarization of the first and second device light is being rotated by the polarization rotators.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising"

may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

Laser remote phosphor technology may be used in high brightness applications such as in automotive and stage lighting. Herein, a blue laser light source may pump a remote phosphor to provide yellow converted light. Another blue laser light source may be projecting blue laser light onto a diffuser (for safety purpose) to provide blue diffused light. The yellow converted light and blue diffused light may be combined downstream by suitable optics such as one or more dichroic elements to obtain white light. The phosphor and diffuser can both be used in the transmissive or reflective mode. It is desired to improve the performance of laser-phosphor technology, especially for providing high brightness white light. Amongst others, it is herein proposed to use a system comprising a first blue laser light source providing a first beam B1 of first (P) polarized blue laser light at a first intensity (I1), a second blue laser light source (S2) providing a second beam B2 of second (P) polarized blue laser light at a second intensity (I2), a phosphor element, a diffuser element, a reflective polarizer and a controller for individually controlling the first polarized P blue laser light provided by said first blue laser light source and the second polarized P blue laser light provided by said second blue laser light source. B1 may be arranged at 90 degrees with respect to B2. The reflective polarizer is arranged at 45° with respect to B and B2. In embodiments, the polarization reflection of the reflective polarizer can be changed from P polarization reflective to a S polarization reflective (and/or vice versa). Alternatively, a highly reflective specular mirror may be removed and inserted under an angle of 45° with respect to B1 and B2. The obtained effect may be improved performance, namely improved lifetime. In embodiments, the power ratio between pump light and blue light may be >1. At maximum laser power the laser output drops enormously over lifetime (i.e. lm maintenance over time), while the lifetime of the laser is much higher when driving the laser at a lower power e.g. a 35% vs. a 5% drop in brightness. In embodiments, the reflective polarizer can be rotated for 90 degrees or polarization rotation elements can be arranged between the laser light sources and the reflective polarizer. A controller can (simultaneously) change the ratio of I1/I2 e.g. to keep the correlated color temperature (CCT) constant or within a predetermined CCT range e.g. from 6000 to 10000K e.g. to make the system CCT tunable. One can switch (automatically) between both settings at the start of each usage. Alternatively, a clock module with a predefined duration e.g. 5000 hrs may be used to automatically e.g. electrically or mechanically by a user change the polarization of the reflective polarizer. A database with lm maintenance data can be used for optimal driving settings when switching sources to correct for the drop.

The invention claimed is:

1. A light generating system comprising a first light generating arrangement, a second light generating arrangement, a luminescent element, a diffuser element, a beam direction control system, and a control system, wherein:

the first light generating arrangement is configured to generate a first beam (B1) of first device light, wherein the first light generating arrangement comprises a first solid state laser light source;

the second light generating arrangement is configured to generate a second beam (B2) of second device light, wherein the second light generating arrangement comprises a second solid state laser light source;

the first device light comprises a first polarization (P1) and the second device light comprises the first polarization (P1);

the luminescent element comprises a luminescent material, wherein the luminescent material is able to convert the first device light and/or the second device light received by the luminescent material into luminescent material light;

the diffuser element is configured to diffuse first device light- and/or the second device light received by the diffuser element, thereby providing diffused light;

the beam direction control system is configured in a light receiving relationship with the first light generating arrangement and the second light generating arrangement, and configured to direct:

in a first operational mode of the beam direction control system (i) a first pump part of the first device light and/or the second device light, having a first pump intensity, to the luminescent element, and (ii) a first diffuser part of the first device light and/or the second device light, having a first diffuser part intensity (Id1), to the diffuser element; and in a second operational mode of the beam direction control system (i) a second pump part of the first device light and/or the second device light, having a second pump intensity (Ip2), to the luminescent element, and (ii) a second diffuser part of the first device light and/or the second device light, having a second diffuser part intensity (Id2), to the diffuser element;

the first pump intensity (Ip1) and the second pump intensity (Ip2) have different relative contributions of the first device light and/or the second device light; and the first diffuser part intensity (Id1) and the second diffuser part intensity (Id2) have different relative contributions of the first device light and/or the second device light;

the beam direction control system further comprises a reflective polarizer, configured to reflect light having a first polarization (P1), and the beam direction control system is further configured to direct:

in the first operational mode of the beam direction control system (i) first device light, having the first polarization (P1), to the luminescent element, and (ii) second device light, having the first polarization (P1), to the diffuser element; and in the second operational mode of the beam direction control system (i) second device light, having the first polarization (P1), to the luminescent element, and (ii) first device light, having the first polarization (P1), to the diffuser element;

the control system is configured to control the first light generating arrangement, the second light generating arrangement, and the beam direction control system; and the light generating system is configured to generate system light comprising the luminescent material light and the diffused light.

2. The light generating system according to claim 1, wherein the control system is configured to control the first light generating arrangement, the second light generating arrangement, and the beam direction control system, such that in the first operational mode $Ip1/Id1>1$, and in the second operational mode $Ip2/Id2>1$; and wherein the control system is configured to control the first operational mode and the second operational mode in dependence of one or more of a time-related signal, a sensor signal, and a user input.

3. The light generating system according to claim 1, wherein the system light is white system light, and wherein the beam direction control system is configured to direct:

in the first operational mode of the beam direction control system (i) first device light, having the first pump intensity (Ip1), to the luminescent element, and (ii) second device light, having the first diffuser part intensity (Id1), to the diffuser element; and in the second operational mode of the beam direction control system (i) second device light, having the second pump intensity (Ip2), to the luminescent element, and (ii) first device light, having the second diffuser part intensity (Id2), to the diffuser element.

4. The light generating system according to claim 1, wherein the beam direction control system comprises a control region, wherein during operation of the light generating system first device light and second device light propagate through the control region under a first mutual angle ($\alpha 1$), wherein $\alpha 1=90°$.

5. The light generating system according to claim 1, wherein the luminescent element comprises a luminescent body comprising a ceramic luminescent material.

6. The light generating system according to claim 1, wherein the beam direction control system is configured to control the first operational mode and the second operational mode by rotating the reflective polarizer.

7. The light generating system according to claim 1, wherein the beam direction control system is configured to control the first operational mode and the second operational mode by controlling a polarization of the first device light and a polarization of the second device light.

8. The light generating system according to claim 4, wherein the beam direction control system comprises an actuator (550), wherein the beam direction control system (500) is configured to select with the actuator a position of an optical element within or outside the control region, wherein the control system is configured to control the position of the optical element in dependence of the operational mode; and wherein the optical element comprises the reflective polarizer.

9. The light generating system according to claim 1, wherein the control system is configured to maintain a correlated color temperature of the system light within ±300K and/or ±10 standard deviation of color matching from a predetermined correlated color temperature.

10. The light generating system according to claim 1, wherein the system light has a correlated color temperature selected from the range of 6000-10,000 K; and wherein the light generating system is operated in the transmissive mode or the reflective mode.

11. The light generating system according to claim 1, wherein $Ip1/Id1\geq 1.5$ and wherein $Ip2/Id2\geq 1.5$.

12. The light generating system according to claim 1, wherein the control system is configured to change from one mode to another mode after a predetermined operation time; wherein the predetermined operation time is selected from the range of at least 2000 h.

13. The light generating system according to claim 1, further comprising a sensor, wherein the sensor is configured to generate a sensor signal related to an absolute or relative contribution of the first device light and/or the second device light to the system light.

14. The light generating system according to claim 1, wherein the control system is configured to control a spectral power distribution of the system light.

15. A lighting device selected from the group of a lamp (1), a luminaire (2), a projector device (3), and a stage lamp, comprising the light generating system according to claim 1, wherein the lighting device is configured to generate system light.

* * * * *